United States Patent [19]
Kubo et al.

[11] Patent Number: 5,636,215
[45] Date of Patent: Jun. 3, 1997

[54] RING TYPE ATM NETWORK SYSTEM

[75] Inventors: Akihiko Kubo; Toshiyuki Takahashi, both of Hyogo, Japan

[73] Assignee: Mitsubishi Denki Kabushiki Kaisha, Tokyo, Japan

[21] Appl. No.: 533,668

[22] Filed: Sep. 25, 1995

[30] Foreign Application Priority Data

Dec. 27, 1994 [JP] Japan .................................. 6-325304

[51] Int. Cl.$^6$ .............................................. H04L 12/433
[52] U.S. Cl. ........................... 370/397; 370/409; 370/912
[58] Field of Search .............................. 370/16.1, 85.12, 370/85.15, 94.1; 395/200.21

[56] References Cited

U.S. PATENT DOCUMENTS

| | | | |
|---|---|---|---|
| 4,835,763 | 5/1989 | Lau | 370/16 |
| 5,150,356 | 9/1992 | Tsutsui | 370/16.1 |
| 5,241,540 | 8/1993 | Ochletree | 370/85.12 |
| 5,469,428 | 11/1995 | Tokura et al. | 370/16.1 |

OTHER PUBLICATIONS

H. Yokota et al., The Institute of Electronics Information and Communication Engineers, "Broadband Multimedia Customer Premises Network (Mars Network)", SSE92–187, IN92–151(1993–03), pp. 25–30.

Franz–Joachim Kauffels, Practical LANs Analysed, John Wiley & Sons, pp. 90–95.

*Primary Examiner*—Douglas W. Olms
*Assistant Examiner*—Matthew C. Phillips
*Attorney, Agent, or Firm*—Rothwell, Figg, Ernst & Kurz

[57] ABSTRACT

In a ring type ATM network system employing an ATM cell transmission mode, two paths are provided to correspond to a dual ring between node equipments, one path is selected to transmit a cell, and the other path is defined as a stand-by system. The path is selected for each combination of the node equipments, and is switched over to the stand-by system when a malfunction is caused. In order to configure a path for multicast, a multicast cell is not relayed between specific adjacent node equipments, thereby logically regarding the two rings as two buses. It is thereby possible to select a path having a smaller number of passing node equipments in a normal state, and reduce a transmission delay. During reconfiguration of a path at a time of occurrence of the malfunction in the ring or the node equipment, it is possible to reduce the transmission delay between optional node equipments to a delay less than a time required for one cycle of the ring, and to implement multicast transmission of the cell.

3 Claims, 34 Drawing Sheets

| VPI/VCI VALUE-OUTGOING CORRESPONDING TABLE | |
|---|---|
| VPI/VCI VALUE | OUTGOING ID |
| | |
| | |
| | |
| | |

| VPI/VCI CONVERSION TABLE ||
| INPUT VALUE | UPDATED VALUE |
| | |
| | |
| | |

FIG. 12

1) SETTING IN NODE C

CELL SWITCH 36a

| VPI/VCI VALUE-OUTGOING LINE CORRESPONDING TABLE | |
|---|---|
| VPI/VCI VALUE | OUTGOING ID |
| X | #1 |

RING 1 39a

| VPI/VCI CONVERSION TABLE | |
|---|---|
| INPUT VALUE | UPDATED VALUE |
| X | a |

RING 2 39b

| VPI/VCI CONVERSION TABLE | |
|---|---|
| INPUT VALUE | UPDATED VALUE |
| X | b |

2) SETTING IN NODE A

CELL SWITCH 36b

| VPI/VCI VALUE-OUTGOING LINE CORRESPONDING TABLE | |
|---|---|
| VPI/VCI VALUE | OUTGOING ID |
| a | #4 |
| b | #4 |

ATM INTERFACE

| VPI/VCI CONVERSION TABLE | | 39c |
|---|---|---|
| INPUT VALUE | UPDATED VALUE | |
| a | y | |
| b | y | |

3) SETTING IN NODE B

CELL SWITCH 36c

| VPI/VCI VALUE-OUTGOING LINE CORRESPONDING TABLE | |
|---|---|
| VPI/VCI VALUE | OUTGOING ID |
| a | #1 |

4) SETTING IN NODES D AND E

CELL SWITCH 36d

| VPI/VCI VALUE-OUTGOING LINE CORRESPONDING TALBE | |
|---|---|
| VPI/VCI VALUE | OUTGOING ID |
| b | #2 |

FIG. 13

VPI VALUE ASSIGNMENT TABLE — 50

| NODE ID | VPI VALUE |
|---|---|
| A | x'010'~x'01F' |
| B | x'020'~x'02F' |
| C | x'030'~x'03F' |
| D | x'040'~x'04F' |
| E | x'050'~x'05F' |

VPI VALUE [NODE C] ALLOCATION TABLE — 53

| NODE ID | PRIMARY RING VPI VALUE | SECONDARY RING VPI VALUE |
|---|---|---|
| A | x'030' | x'031' |
| B | x'032' | x'033' |
| D | x'034' | x'035' |
| E | x'036' | x'037' |

1) SETTING IN NODE C

CELL SWITCH — 36a

| VPI/VCI VALUE-OUTGOING LINE CORRESPONDING TABLE | |
|---|---|
| VPI/VCI VALUE | OUTGOING ID |
| X | #1 → #2 |

FIG. 21

| MULTICAST REGISTERING TABLE 67 ||
|---|---|
| MULTICAST VPI/VCI VALUE 68 | OUTGOING LINE ID 69 |
|  |  |
|  |  |
|  |  |
|  |  |

FIG. 22

| CELL SWITCH IN NODE A | 67a |
|---|---|
| MULTICAST REGISTERING TABLE | |
| MULTICAST VPI/VCI VALUE | OUTGOING LINE ID |
| mx | #2 |
| mb | #4 |

| CELL SWITCH IN NODE B | 67b |
|---|---|
| MULTICAST REGISTERING TABLE | |
| MULTICAST VPI/VCI VALUE | OUTGOING LINE ID |
| mx | #1,#2 |
| ma | #2,#4 |
| mb | #1,#4 |

| CELL SWITCH IN NODE C | 67c |
|---|---|
| MULTICAST REGISTERING TABLE | |
| MULTICAST VPI/VCI VALUE | OUTGOING LINE ID |
| mx | #1,#2 |
| ma | #2,#4 |
| mb | #1,#4 |

| CELL SWITCH IN NODE D | 67d |
|---|---|
| MULTICAST REGISTERING TABLE | |
| MULTICAST VPI/VCI VALUE | OUTGOING LINE ID |
| mx | #1,#2 |
| ma | #2,#4 |
| mb | #1,#4 |

| CELL SWITCH IN NODE E | 67e |
|---|---|
| MULTICAST REGISTERING TABLE | |
| MULTICAST VPI/VCI VALUE | OUTGOING LINE ID |
| mx | #1 |
| ma | #4 |

SETTING IN ALL NODES

RING 1

| VPI/VCI CONVERSION TABLE | |
|---|---|
| INPUT VALUE | UPDATED VALUE |
| mx | mb |

39d

RING 2

| VPI/VCI CONVERSION TABLE | |
|---|---|
| INPUT VALUE | UPDATED VALUE |
| mx | ma |

39e

ATM INTERFACE

| VPI/VCI CONVERSION TABLE | |
|---|---|
| INPUT VALUE | UPDATED VALUE |
| ma | mx |
| mb | mx |

CELL SWITCH IN NODE A  67a

MILTICAST REGISTERING TABLE

| MULTICAST VPI/VCI VALUE | OUTGOING LINE ID |
|---|---|
| mx | #1,#2 |
| ma | #2,#4 |
| mb | #1,#4 |

CELL SWITCH IN NODE B  67b

MULTICAST REGISTERING TABLE

| MULTICAST VPI/VCI VALUE | OUTGOING LINE ID |
|---|---|
| mx | #1 |
| ma | #4 |

CELL SWITCH IN NODE C  67c

MULTICAST REGISTERING TABLE

| MULTICAST VPI/VCI VALUE | OUTGOING LINE ID |
|---|---|
| mx | #2 |
| mb | #4 |

CELL SWITCH IN NODE D  67d

MULTICAST REGISTERING TABLE

| MULTICAST VPI/VCI VALUE | OUTGOING LINE ID |
|---|---|
| mx | #1,#2 |
| ma | #2,#4 |
| mb | #1,#4 |

CELL SWITCH IN NODE E  67e

MULTICAST REGISTERING TABLE

| MULTICAST VPI/VCI VALUE | OUTGOING LINE ID |
|---|---|
| mx | #1,#2 |
| ma | #2,#4 |
| mb | #1,#4 |

FIG. 31

1) SETTING IN NODE C

CELL SWITCHS 36e
1 AND 2

| VPI/VCI VALUE-OUTGOING LINE CORRESPONDING TABLE | |
|---|---|
| VPI/VCI VALUE | OUTGOING ID |
| x | #1 |

RING 39g
1 AND 2

| VPI/VCI CONVERSION TABLE | |
|---|---|
| INPUT VALUE | UPDATED VALUE |
| x | a |

2) SETTING IN NODE A

CELL SWITCHS 36f
1 AND 2

| VPI/VCI VALUE-OUTGOING LINE CORRESPONDING TABLE | |
|---|---|
| VPI/VCI VALUE | OUTGOING ID |
| a | #4 |

ATM INTERFACE
VPI/VCI          39h
CONVERSION 1

| VPI/VCI CONVERSION TABLE | |
|---|---|
| INPUT VALUE | UPDATED VALUE |
| a | x |

AMT INTERFACE
VPI/VCI          39i
CONVERSION 2

| VPI/VCI CONVERSION TABLE | |
|---|---|
| INPUT VALUE | UPDATED VALUE |
| a | y |

3) SETTING IN NODES B, D, AND E

CELL SWITCHS 36g
1 AND 2

| VPI/VCI VALUE-OUTGOING LINE CORRESPONDING TABLE | |
|---|---|
| VPI/VCI VALUE | OUTGOING ID |
| a | #1 |

RING TYPE ATM NETWORK SYSTEM

BACKGROUND OF THE INVENTION

1. Field of the Invention

The present invention relates to a ring type ATM network system where an ATM cell transmission mode is employed.

2. Description of the Prior Art

FIG. 35 is a diagram showing a configuration of a node equipment in a conventional ring type ATM (Asynchronous Transfer Mode) shown in "Local ATM Communication System (MARS [Magnetic Automatic Reservation Ssytem] network)", IEICE Technical Report SSE92-187, The Institute of Electronics, Information and Communication Engineers. In the drawing, reference numeral 1 means the node equipment, 2 is a cell switch portion to exchange a cell, 3 is a ring interface portion connected to another node equipment 1 by using a dual ring as a medium, 4 is a port interface portion employing an ATM cell transmission procedure, connected to ATM terminals, 5 is a bus to link portions forming the node equipment 1, and 6 is a manage/control portion to manage and control the respective portions through the bus. Further, reference numeral 7 means an ATM interface employing a procedure for communication with the ATM terminal to transmit and receive the cell, 8 is a cell switch to decide and output a path for the inputted cell, 9 is an SDH terminator to execute an SDH (Synchronous Digital Hierarchy) transmission procedure between one node equipment 1 and the other node equipment 1, 10 is a TC processing to control a cell header and control loop back for the dual ring, and 11 is a ring access to control cell access to the ring. The node equipment means the equipment which can switch ATM cells.

FIG. 36 is a diagram of a configuration of a network system using the node equipment 1, specially showing a state in which no abnormality is caused in a ring and the node equipment 1. Reference numeral 12 means a ring connected between the node equipment 1, and the arrow denotes a direction of signal transmission. Reference numeral 12a means a primary ring, 12b is a secondary ring, and 13 is ATM terminals employing an ATM cell transmission procedure, connected to the node equipment 1. FIG. 37 is a diagram of a configuration of the same network system as that in FIG. 36, specially showing a state in which abnormality is caused in a transmission line. The mark X means occurrence of a malfunction, and the solid line is a transmission line used for cell transmission. In the illustrative configuration, the ring includes five node equipments 1a to 1e. In the following discussion, the respective node equipments 1 are referred to as node A, node B, node C, node D, and node E.

FIG. 38 is a diagram showing a cell format serving as unit of information transmission. In the drawing, reference numeral 14 means a cell including 53 bytes, 15 is a header containing cell control information, 16 is an information field including 48 bytes and serving as an area for information transmission, 17 is a VPI (Virtual Path Identifier) which is an identifier of a virtual path, and serves as one of the cell control information, and 18 is a VCI (Virtual Channel Identifier) which is an identifier of a virtual connection, and serves as one of the cell control information.

A description will now be given of the operation. A method of transmitting the cell 14 will be described by way of, as an example, a case where the cell 14 is transmitted from an ATM terminal 13f to an ATM terminal 13a. The cell 14 is transmitted from the ATM terminal 13f, and the ATM interface 7 in the node C receives the cell 14 to input the cell 14 into the cell switch 8. Path information is previously set in the cell switch 8 so that a decision of path is made depending upon the path information, the VPI 17 and the VCI 18 in the header 15. If the result of decision requests transmission to another node equipment 1, the cell 14 is transmitted to the ring 12 via the ring access 11 and the ring interface portion 3. The cell 14 is transmitted in a direction of the solid line in FIG. 36, and is received by the node A connected to the destination ATM terminal 13a via the node D and the node E. In the node A, the cell 14 is transmitted via the ring interface portion 3 and the ring access 11, and is inputted into the cell switch 8 for the decision of path. After the decision of path is made in the cell switch 8, the cell 14 is outputted to the ATM interface 7 connected to the destination ATM terminal 13a. The ATM interface 7 transmits the cell 14 to the ATM terminal 13a.

The conventional network includes the dual ring 12 in order to enhance reliability. The secondary ring 12b in the two rings 12 serves as a stand-by ring. When the ring 12 and the node equipments 1 are normal, the cell 14 is transmitted by using only the primary ring 12a as shown by the solid line in FIG. 36. That is, the cell 14 is transmitted from the node A to the node C along a path in the order of 1a, 1b, and 1c. As shown in FIG. 37, a malfunction may be caused between, for example, the node B and the node C in the ring 12. In this case, the cell 14 is looped at the node equipments 1b and 1c disposed at both ends of the malfunction. That is, the cell 14 is looped at the node equipment 1b from primary ring 12a to the secondary ring 12b, and is looped at the node equipment 1c from the secondary ring 12b to the primary ring 12a, thereby forming one ring as shown by the solid line. This is called a loop back mode. The loop back is carried out in the TC processing 10. In a loop back state shown in FIG. 37, the cell 14 is transmitted from the node A to the node C along a path in the order of 1a, 1b, 1a, 1e, 1d, and 1c.

The conventional ring type ATM network system is provided as set forth above. Hence, there are problems in that the number of passing node equipment is more increased in the loop back state than would be in a normal state, a distance of the transmission path is more extended, and a longer transmission delay is caused between the node equipments. In some combinations of the node equipments, the transmission delay may be increased up to approximately twice a transmission delay in the normal state. Further, even in the normal state, since the one ring of the dual ring is exclusively used, the cell should be transmitted along a path having a long transmission delay in some combinations of the node equipments.

SUMMARY OF THE INVENTION

In view of the foregoing, it is an object of the present invention to provide an equipment which can reduce a transmission delay by employing two rings for cell transmission in a normal state, and which, during reconfiguration of a path at a time of occurrence of a malfunction in a ring or a node equipment, can reduce the transmission delay between optional node equipments to a delay less than a time required for one cycle of the ring, and can implement multicast (broadcast communication) transmission of a cell.

According to the present invention, for achieving the above-mentioned object, there is provided a ring type ATM network system in which two paths are provided between one node equipment and another node equipment to pass through a primary ring and a secondary ring, the two paths are identified by a combination of a VPI value and a VCI value (hereinafter referred to as VPI/VCI value), a receiving node equipment can receive a cell from the two paths, a transmitting node equipment transmits the cell after selecting one of the paths according to the VPI/VCI value, and the other path is defined as a stand-by system.

As stated above, the transmitting node equipment selects any one of the two paths provided between the node equipments to pass the primary ring and the secondary ring. It is also possible to select a path having a smaller number of passing node equipments.

According to one preferred embodiment, an appropriate number of VPI values are assigned to node equipment. In the node equipment, the VPI value is allocated for each path to another node equipment, and the VPI value is used to identify two paths provided between the node equipment and another node equipment to pass through a primary ring and a secondary ring. One of the two paths having different VPI values is defined as a current system, and the other path is defined as a standby system. When a malfunction is caused, in a node equipment to which a malfunction occurring position is posted, the path is switched over from the current system to the stand-by system depending upon the VPI value. Since the path between the node equipments can be identified by the VPI value, when the malfunction position is posted at the time of occurrence of the malfunction, a path affected by the malfunction is switched by a transmitting node equipment to the stand-by system path depending upon the VPI value.

According to another preferred embodiment, a specific node equipment on a ring is regarded as the farthest upstream node equipment in a primary ring and as the farthest downstream node equipment in a secondary ring, and the farthest downstream node equipment in the primary ring is positioned in the farthest upstream of the secondary ring. Further, the node equipment positioned in the farthest downstream does not relay a cell to an adjacent node equipment in a downstream direction. Node equipment to transmit or receive a cell used for multicast have paths having different VPI/VCI values on the primary ring and the secondary ring. A receiving node equipment is set in a state in which the cell can be received from the two paths, and a transmitting node equipment duplicates the cell to transmit the cell to the two paths. The two rings are regarded as two buses through which the cell is transmitted from the upstream to the downstream, and the two paths having different VPI/VCI values are provided. Thereby, the multicast cell transmitted from one node equipment passes through the two paths, and the cell is transmitted to all the node equipments only once.

According to still another embodiment, two paths are provided to pass through a primary ring and a secondary ring between the node equipment and another node equipment. A transmitting node equipment transmits the same cell to the two paths, and a receiving node equipment receives the cell by selecting one of the two paths. Consequently, it is also possible to select a path having a smaller number of passing node equipments.

Alternatively, a cell switch may be duplicated such that one cell switch has input-output corresponding to the primary ring, and the other cell switch has input-output corresponding to the secondary ring. An ATM interface portion may be provided with input-output corresponding to each of the two cell switches, and the ATM interface portion may duplicate the cell, thereby sending the cell having the same information to the two cell switches. Further, the ATM interface portion may receive output from the two cell switches, and the same VPI/VCI value may be allocated to the two paths.

Preferably, a specific node equipment on a ring is regarded as the farthest upstream node equipment in a primary ring and as the farthest downstream node equipment in a secondary ring, and the farthest downstream node equipment in the primary ring is positioned in the farthest upstream of the secondary ring. Further, at a time of multicast, a transmitting node equipment transmits a cell to two paths, and the node equipment positioned in the farthest downstream does not relay the cell to an adjacent node equipment in a downstream direction. A receiving node equipment is set in a state in which the cell can be received from the two paths. The two rings are regarded as two buses through which the cell is transmitted from the upstream to the downstream. Thus, the multicast cell transmitted from one node equipment passes through the two paths, and the cell is transmitted to all the node equipments only once.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 12 is a diagram showing VPI/VCI value-outgoing line corresponding tables and VPI/VCI conversion tables which are stored in the node equipment used in the first and second embodiments of the present invention, and contain setting information corresponding to the network configuration in FIG. 10;

FIG. 13 is a diagram showing a VPI value assignment table which is stored in the node equipment used in the second embodiment of the present invention;

FIG. 14 is a diagram showing a VPI value [node C] allocation table which is stored in the node equipment used in the second embodiment of the present invention;

FIG. 15 is a diagram showing a VPI/VCI value-outgoing line corresponding table which is stored in the node equipment used in the second embodiment of the present invention;

FIG. 21 is a diagram showing a multicast registering table which is stored in the node equipment used in the third and fifth embodiments of the present invention;

FIG. 22 is a diagram showing multicast registering tables and VPI/VCI conversion tables which are stored in the node equipment used in the third embodiment of the present invention, and contain setting information corresponding to the network configuration in FIG. 20;

FIG. 25 is a diagram showing the multicast registering tables and the VPI/VCI conversion tables which are stored in the node equipment used in the third embodiment of the present invention, and contain setting information corresponding to the network configuration in FIG. 23;

FIG. 31 is a diagram showing VPI/VCI value-outgoing line corresponding tables and VPI/VCI conversion tables which are stored in the node equipment used in the fourth embodiment of the present invention, and contain setting information corresponding to the network configuration in FIG. 30;

DETAILED DESCRIPTION OF THE PREFERRED EMBODIMENTS

Figure 1:
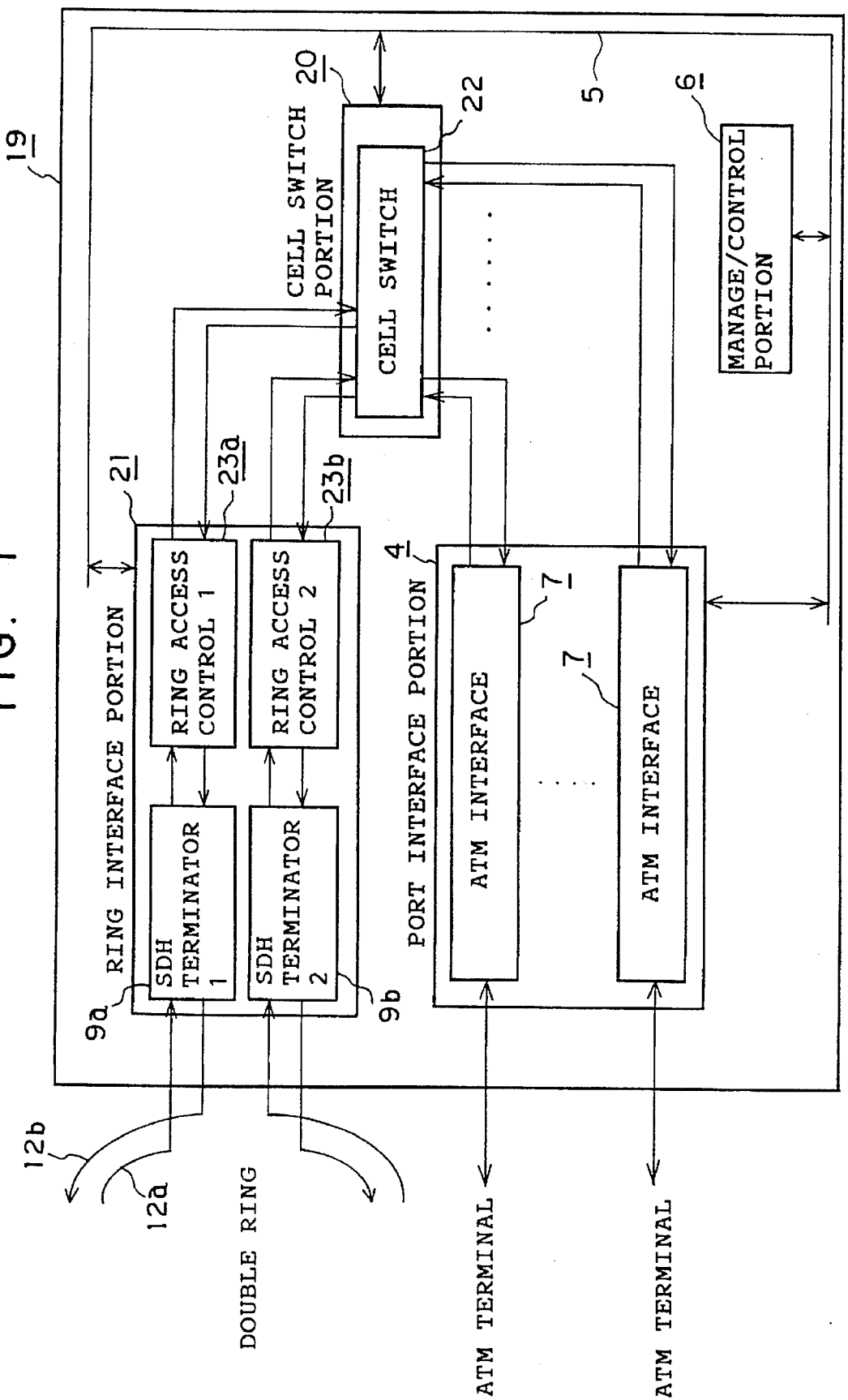
FIG. 1 is a diagram showing a configuration of a node equipment in a ring type ATM network system in first to third embodiments of the present invention.

FIG. 1 is a diagram showing a configuration of a node equipment in a ring type ATM network system according to one embodiment of the present invention. In the drawing, reference numeral 19 means the node equipment, 20 is a cell switch portion to exchange a cell, and 21 is a ring interface portion connected to another node equipment 19 by using a dual ring as a medium. Further, reference numeral 4 means a port interface portion employing an ATM cell transmission procedure (defined in, for example, ITU-TG707, G708, and G709), connected to ATM terminals, 5 is a bus to link portions forming the node equipment 19, and 6 is a manage/control portion to manage and control the portions through the bus 5. Reference numeral 12 means a ring serving as a medium to be connected to another node equipment 19, and the ring 12 includes a primary ring 12a and a secondary ring 12b. Reference numeral 7 means ATM interfaces employing a communication procedure between the ATM terminals, to transmit and receive the cell, 22 is a cell switch to decide and output a path for the inputted cell, 9 is SDH terminators to execute an SDH transmission procedure between one equipment 19 and the other node equipment 19, and the SDH terminators 9 include an SDH terminator 19a to receive information from the primary ring 12a, and an SDH terminator 2 9b to receive information from the secondary ring 12b. Further, reference numeral 23 means a ring access control to control a cell header and control a cell access to the ring, and the ring access control 23 includes a ring access control 1 23a to receive a cell from the primary ring 12a, and a ring access control 2 23b to receive a cell from the secondary ring 12b.

Figure 2:
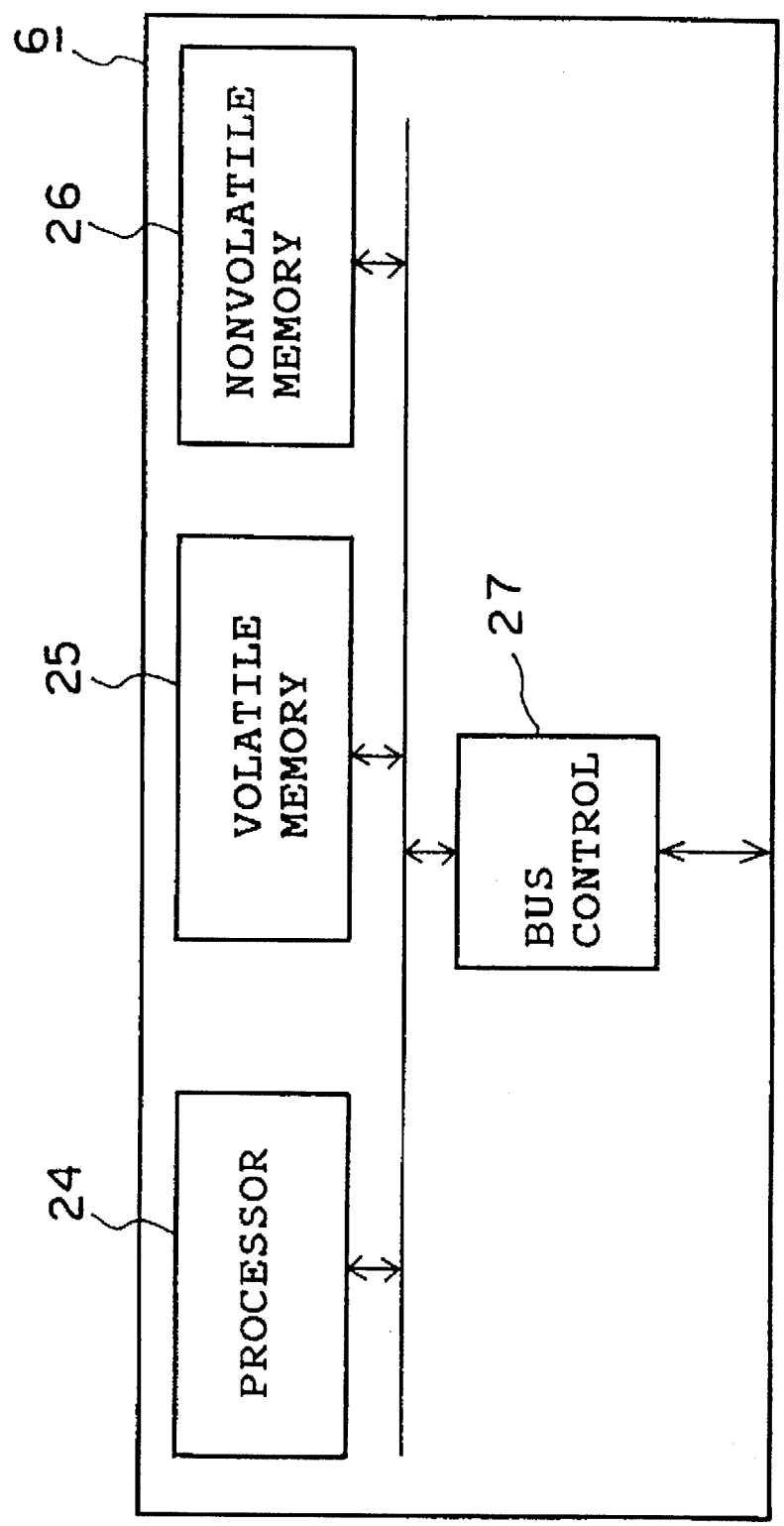
FIG. 2 is a diagram showing a configuration of a manage/control portion mounted in a node equipment used in first to fifth embodiments of the present invention.

FIG. 2 is a diagram showing an internal configuration of the manage/control portion 6. In the drawing, reference numeral 24 means a processor, 25 is a volatile memory to contain a program or data, 26 is a nonvolatile memory to contain, for example, a boot program, setting information for the portions in the equipment, and setting information associated with a network, and 27 is a bus control to control the bus linking the portions in the equipment.

Figures 3, 4:
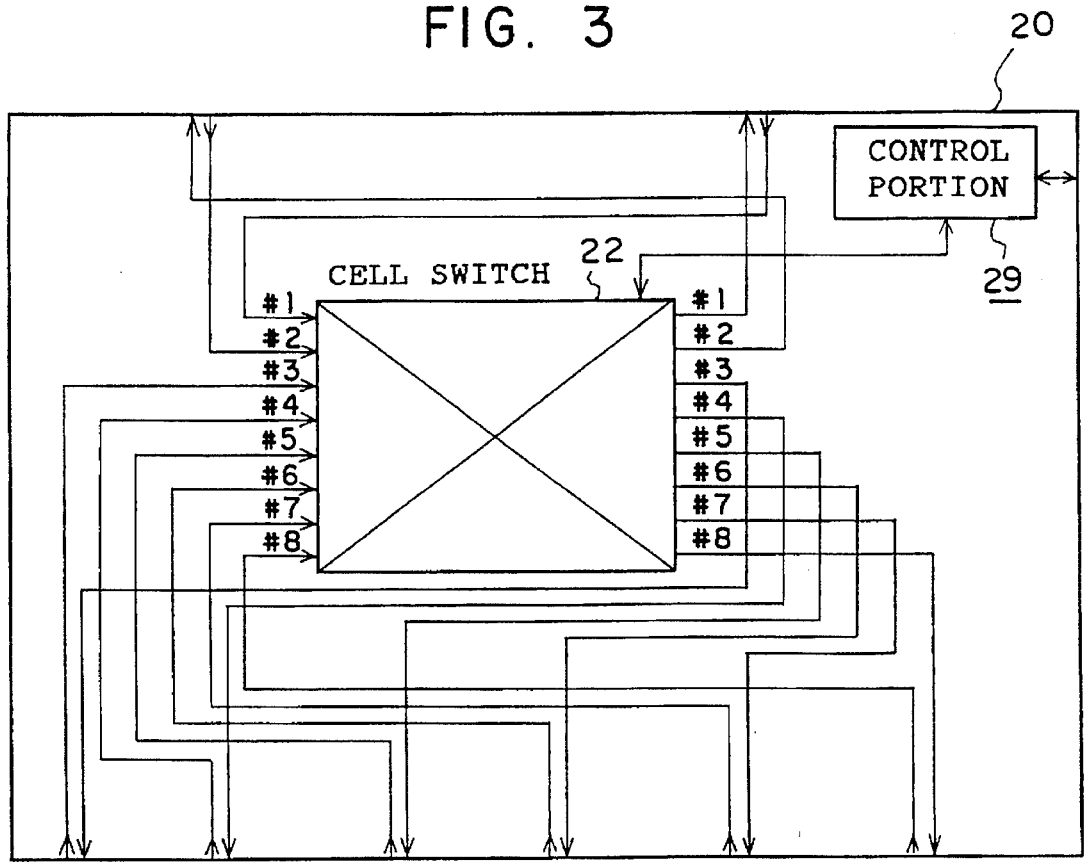
FIG. 3 is a diagram showing a configuration of a cell switch portion mounted in the node equipment used in the first to third embodiments of the present invention.
FIG. 4 is a diagram showing a VPI/VCI value-outgoing line corresponding table serving as setting information for a cell switch which is mounted in the node equipment used in the first, second and fourth embodiments of the present invention.

FIG. 3 is a diagram showing an internal configuration of the cell switch portion 20. In the diagram, the cell switch 22 to exchange a cell includes eight input lines and eight output lines which are identified by using reference numerals #1 to #8. Reference numeral 29 means a control portion to perform internal setting and collect state information such that information can be exchanged between the control portion and the manage/control portion 6. FIG. 4 is a table set in the cell, by which an outgoing line can be derived from a VPI/VCI value serving as an identifier. In the drawing, reference numeral 36 means a VPI/VCI value-outgoing line corresponding table, 37 is a VPI/VCI value showing a VPI value and a VCI value set in the cell header, and 38 is an outgoing line identification to show on which line, when a cell having the set VPI/VCI value 37 is inputted to the cell switch portion 29, the cell should be placed. Information in the VPI/VCI value-outgoing line corresponding table 36 is transmitted from the manage/control portion 6 to the control portion 29 in the cell switch portion 20, and is set in the cell switch 22 by the control portion 29.

Figure 5:
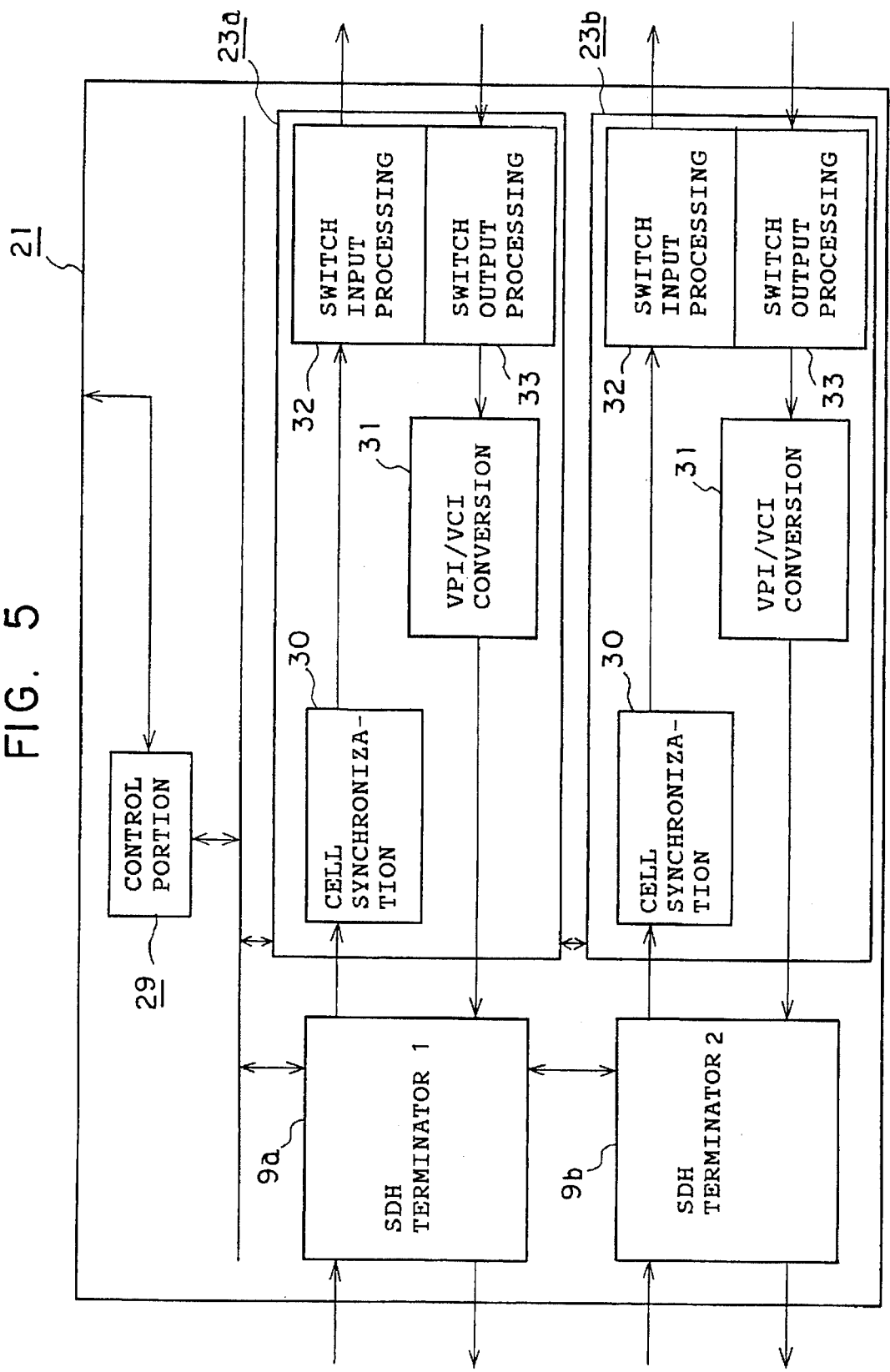
FIG. 5 is a diagram showing a configuration of a ring interface portion mounted in the node equipment used in the first to fifth embodiments of the present invention.

FIG. 5 is a diagram showing an internal configuration of the ring interface portion 21. In the drawing, reference numeral 30 means cell synchronization to extract a cell from a signal string received in the SDH terminator 9, 32 is switch input processing to input the received cell into the cell switch 22, 33 is switch output processing to receive a cell outputted from the cell switch 22, and 31 is VPI/VCI conversion to update the VPI/VCI value in the cell header.

Figure 6:
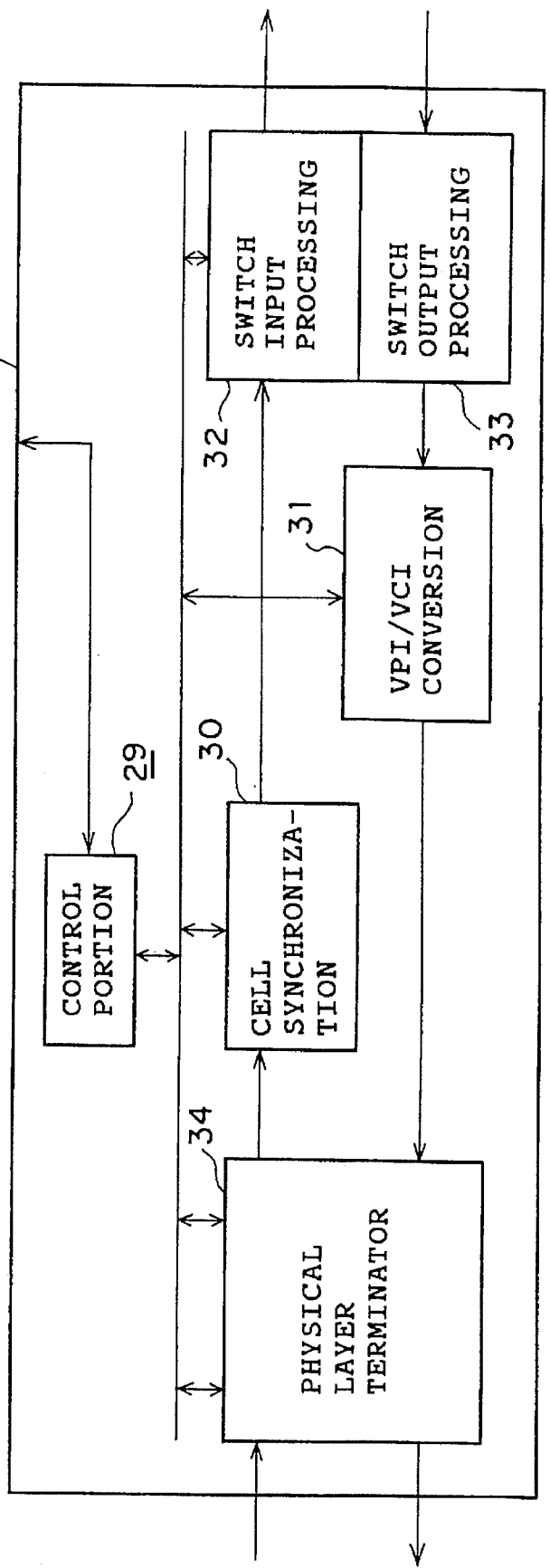
FIG. 6 is a diagram showing a configuration of an ATM interface mounted in the node equipment used in the first to third embodiments of the present invention.
Figures 7, 8:
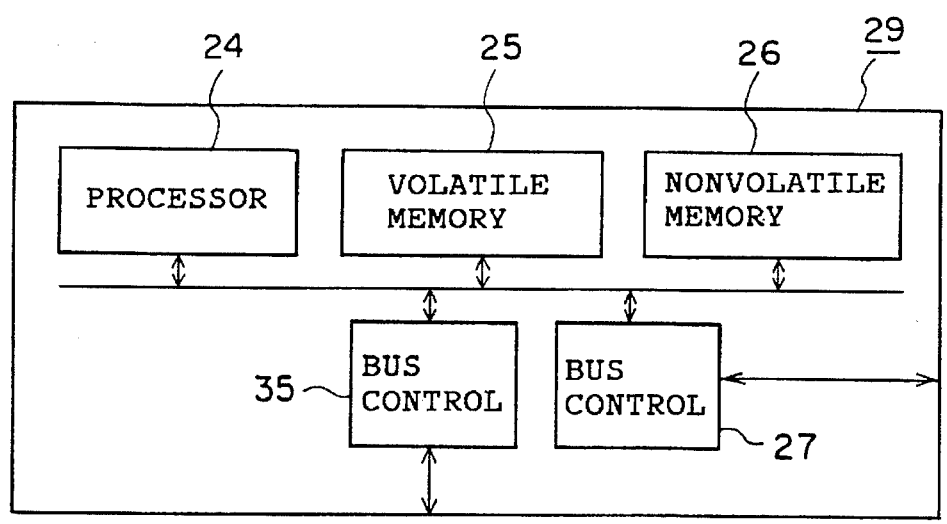
FIG. 7 is a diagram showing a VPI/VCI conversion table serving as setting information for a VPI/VCI conversion which is mounted in the node equipment used in first to fifth embodiments of the present invention.
FIG. 8 is a diagram showing a configuration of a control portion which is mounted in the node equipment used in the first to fifth embodiments of the present invention.

FIG. 6 is a diagram showing an internal configuration of the ATM interface 7. In the drawing, reference numeral 34 means a physical layer terminator serving as an interface with the ATM terminal so as to perform processing at a terminator of a physical layer. FIG. 7 shows a table which is referred by the VPI/VCI conversion 31 in the ring interface portion 21 and the ATM interface 7. In the drawing, reference numeral 39 means a VPI/VCI conversion table, 40 is an input value which is compared with the VPI/VCI value in the header of the cell sent from the switch output processing 33, and 41 is an updated value which is used as the VPI/VCI value when the VPI/VCI value is matched with the input value 40.

FIG. 8 is a diagram showing an internal configuration of the control portion 29 used in the cell switch portion 20, the ring interface portion 21, and the ATM interface 7. In the drawing, reference numeral 35 means a bus control to carry out setting operation for circuits in the cell switch portion 20, the ring interface portion 21, and the ATM interface 7 so as to control the bus for use in collection of state information.

Figure 9:
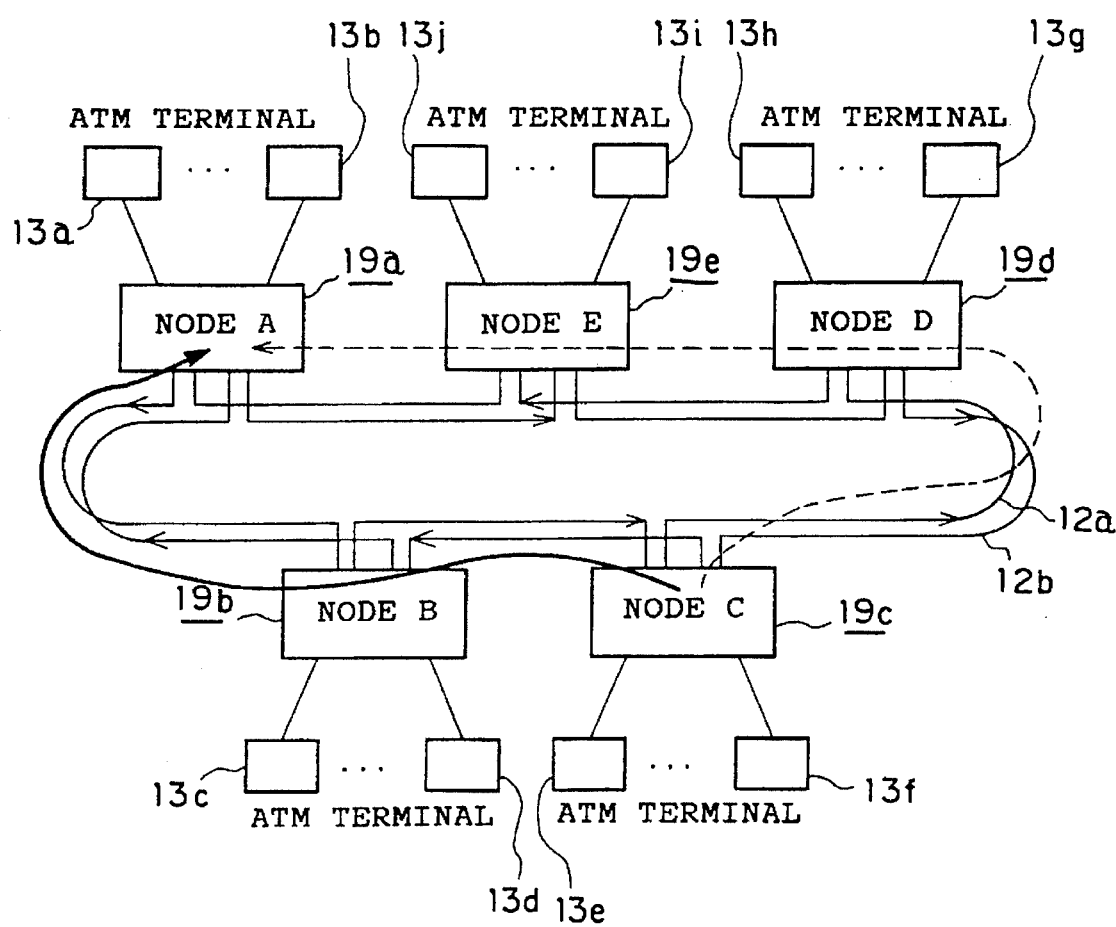
FIG. 9 is a diagram showing a configuration of the ring type ATM network system in the first and second embodiments of the present invention.
Figure 10:
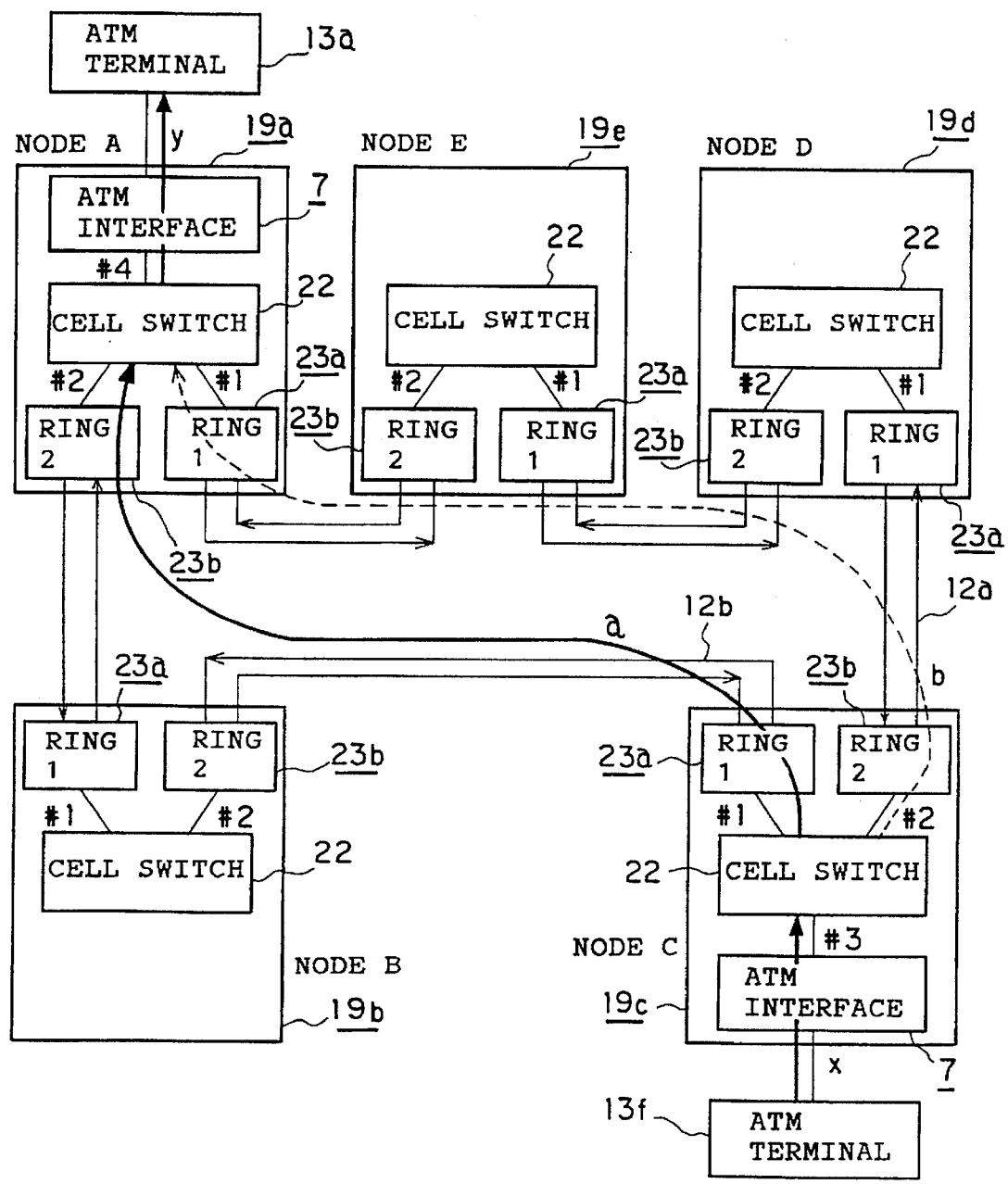
FIG. 10 is a diagram showing the configuration of the ring type ATM network system in the first and second embodiments of the present invention, and illustrating a more specific configuration than that in FIG. 9.

FIG. 9 is a diagram of a network configuration using the node equipment 19. In the drawing, there are two paths shown by the solid line and the broken line from a node C to a node A. The solid line means a current path, and the broken line is a stand-by path. In the diagram, five node equipments 19a to 19e form a ring. The respective node equipments 19 are referred to as node A, node B, node C, node D, and node E. FIG. 10 is a diagram in which an internal configuration of the node equipment 19 is partially added to the network configuration shown in FIG. 9. In the drawing, reference numerals #1 to #4 mean input-output lines for cell switches 22, x and y are VPI/VCI values between ATM terminals 13 and ATM interfaces 7, and a and b are VPI/VCI values between the node equipments 19. The solid line means the current path, and the broken line is the stand-by path. In the drawing, the ring 1 is equivalent to the ring access control 1, and the ring 2 is equivalent to the ring access control 2.

Figure 11:
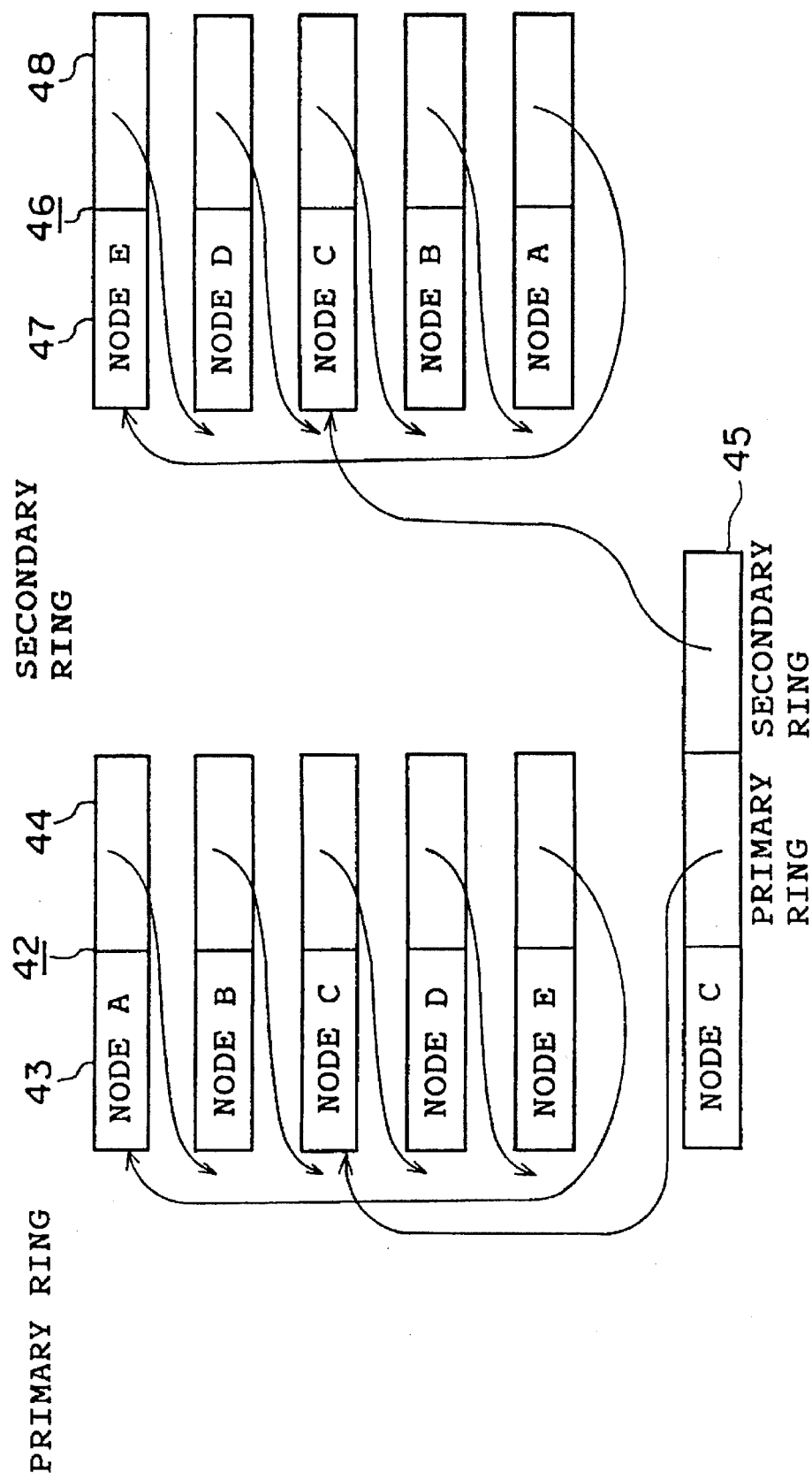
FIG. 11 is a diagram showing a ring format database and node position information which are stored in the node equipment used in the first and second embodiments of the present invention.

FIG. 11 is a database showing the order of connection of the node equipments 19 forming the ring. In the drawing, reference numeral 42 means a ring format database for the primary ring, 43 is a node identifier to identify the node equipment 19, and 44 is a pointer to show another node equipment 19 positioned in the downstream of the node equipment 19. Reference numeral 46 means a ring format database for the secondary ring, 47 is a node identifier to identify the node equipment 19, and 48 is a pointer to show another node equipment 19 positioned in the downstream of the node equipment 19. Further, reference numeral 45 means node position information stored in the respective node equipments 19, and the node position information 45 includes the identifier of the node equipment 19, and pointers to the ring format database 42 for the primary ring and the ring format database 48 for the secondary ring.

FIG. 12 shows information set in VPI/VCI value-outgoing line corresponding tables 36 and VPI/VCI conversion tables 39, in order to establish the paths shown by the solid line and the broken line in FIG. 10. Reference numeral 36a means setting of the cell switch 22 in the node C, 36b is setting of the cell switch 22 in the node A, 36c is setting of the cell switch 22 in the node B, and 36d is setting of the cell switches 22 in the node D and the node E. Reference numeral 39a means setting of the ring access control 1 23a in the node C, 39b is setting of the ring access control 2 23b in the node C, and 39c is setting of the ATM interface 7 in the node A. In the drawing, reference numerals x, y, a, b, #1, #2, and #4 are equivalent to those in FIG. 10.

A description will now be given of the operation. In the manage/control portions 6 of the respective node equipments 19, memories contain the VPI/VCI value-outgoing line corresponding table 36, the VPI/VCI conversion table 39, the ring format databases 42 and 46, and the node position information 45 which are required to exchange the cell. The VPI/VCI value-outgoing line corresponding table 36 is transmitted through the bus 5 to the control portion 29 in the cell switch portion 20, and the information thereof is set in the cell switch 22. The VPI/VCI conversion table 39 is transmitted through the bus 5 to the ring access control 23 and the control portion 29 in the ATM interface 7, and the information thereof is set in the VPI/VCI conversion 31. The ring format databases 42 and 46, and the node position information 45 are used for reconfiguration of the network in the manage/control portion 6.

In FIG. 10, paths from the ATM terminal 13f to the ATM terminal 13a are shown by the solid line and the broken line. Between the node C and the ATM terminal 13f, a path is set to have the VPI/VCI value of x. Between the node A and the ATM terminal 13a, a path is set to have the VPI/VCI value of y. Two paths are set from the node C to the node A, including the current path shown by the solid line and the stand-by path shown by the broken line. The current path has the VPI/VCI value of a, and the stand-by path has the VPI/VCI value of b. These values are identical between all the node equipments 19. Selection of the current system and the stand-by system depends upon setting in the VPI/VCI value-outgoing line corresponding table 36 in the transmitting node equipment 19. In the node C, referring to the ring format databases 42 and 46 and the node position information 45, the solid line path is defined as the current system in which the number of passing node equipment is two (i.e., 19b and 19a), and the broken line path is defined as the stand-by system in which the number of passing node equipment is three (i.e., 19d, 19e, and 19a). In this case, a cell exchanging function (of setting outgoing line depending upon the VPI/VCI value, and updating the VPI/VCI value) is used to set, to #1, an outgoing identification corresponding to the VPI/VCI value of x in the VPI/VCI value-outgoing corresponding table 36a. Thereby, the line #1 is selected by the cell switch 22 in the node C shown in FIG. 10, and the cell is transmitted to the path a.

By using as one example the path between the node equipments 19 shown in FIG. 10, a description will now be given of a path configuration depending upon setting information in FIG. 12. The current system path a from the node C to the node A is configured as follows: When a cell outputted from the cell switch 22 in the node C to the ring access control 1 23a has the VPI/VCI value of x, the VPI/VCI conversion 31 of the ring access control 1 23a converts the VPI/VCI value of the cell into a according to the VPI/VCI conversion table 39a so as to output the cell to the secondary ring 12b. The cell is transmitted through the secondary ring 12b, and is received by the ring access control 2 23b in the node B so as to be inputted into the cell switch 22. Since the VPI/VCI value in the cell is a, the cell switch 22 places the cell on the line #1 according to the VPI/VCI value-outgoing line corresponding table 36c. The ring access control 1 23a receives the cell from the line #1, and transmits the cell to the secondary ring 12b. The cell is transmitted through the secondary ring 12b, and is received by the ring access control 2 23b in the node A so as to be inputted into the cell switch 22. Since the VPI/VCI value in the cell is a, the cell switch 22 places the cell on the line #4 according to the VPI/VCI value-outgoing line corresponding table 36b.

The stand-by system path b from the node C to the node A is configured as follows: When a cell outputted from the cell switch 22 in the node C to the ring access control 2 23b has the VPI/VCI value of x, the VPI/VCI conversion 31 in the ring access control 2 23b converts the VPI/VCI value of the cell into b according to the VPI/VCI conversion table 39b so as to transmit the cell to the primary ring 12a. The cell is transmitted through the primary ring 12a, and is received by the ring access control 1 23a in the node D so as to be inputted into the cell switch 22. Since the VPI/VCI value in the cell is b, the cell switch 22 places the cell on the line #2 according to the VPI/VCI value-outgoing line corresponding table 36d. The ring access control 2 23b receives the cell from the line #2, and transmits the cell to the primary ring 12a. Similarly, the cell passes through the node E. The cell is transmitted through the primary ring 12a, and is received by the ring access control 1 23a in the node A so as to be inputted into the cell switch 22. Since the VPI/VCI value in the cell is b, the cell switch 22 places the cell on the line #4 according to the VPI/VCI value-outgoing line corresponding table 36b.

As set forth above, the two paths can be configured on the dual ring depending upon the above setting in the respective tables shown in FIG. 12. Next, a description will be given of transmission of the cell between the ATM terminals 13 with reference to FIG. 10. The path having the VPI/VCI value of x is set between the ATM terminal 13f and the node C, and the path having the VPI/VCI value of y is set between the node A and the ATM terminal 13a. The ATM terminal 13f sends the cell having the VPI/VCI value of x to the node C. The cell is received by the ATM interface 7, and is inputted into the cell switch 22. In the cell switch 22, the VPI/VCI value-outgoing line corresponding table 36a is referred to detect a term whose VPI/VCI value is x so as to place the cell on the corresponding outgoing line #1. The VPI/VCI value of the cell is changed into a in the ring access control 1 23a connected to the outgoing line #1. The cell passes through the current system path so that the cell switch 22 of the node A places the cell on the line #4. In the VPI/VCI conversion 31 in the ATM interface 7 connected to the line #4, the VPI/VCI value is changed into y according to the VPI/VCI conversion table 39c, and the cell is transmitted to the ATM terminal 13a.

As set forth above, the two paths passing through the primary ring 12a and the secondary ring 12b are provided between the node equipment 19 and another node equipment 19, and the path is selected by the transmitting node equipment 19 so that one path is defined as the current system and the other path is defined as the stand-by system. Since the path is selected for each combination of the node equipments 19, it is possible to select as the current system a path which has a smaller number of passing node equipments 19 and can reduce a delay time. Even when the path is switched over to the stand-by system, the transmission delay becomes less than a time required for one cycle of the ring.

A description will now be given of the second embodiment of the present invention. FIG. 13 is a VPI value assignment table 50 to show assignment of the VPI value to the respective node equipments 19. In the drawing, reference numeral 51 means a node identification to identify the node equipment 19, and 52 is a hexadecimal value of the VPI value assigned to the respective node equipments 19. FIG. 14 is a VPI value [node C] allocation table 53 used to allocate the VPI value to another node equipment 19 in a range assigned in the VPI value assignment table 50 in the node C. In the drawing, reference numeral 54 means a node identifier to identify the destination node equipment 19, 55 is a hexadecimal primary ring VPI value of the VPI value allocated to a path passing through the primary ring 12a, and 56 is a hexadecimal secondary ring VPI value of the VPI value allocated to a path passing through the secondary ring 12b. The manage/control portion 6 contains the VPI value assignment table 50 and the VPI value [node C] allocation table 53.

Figure 16:
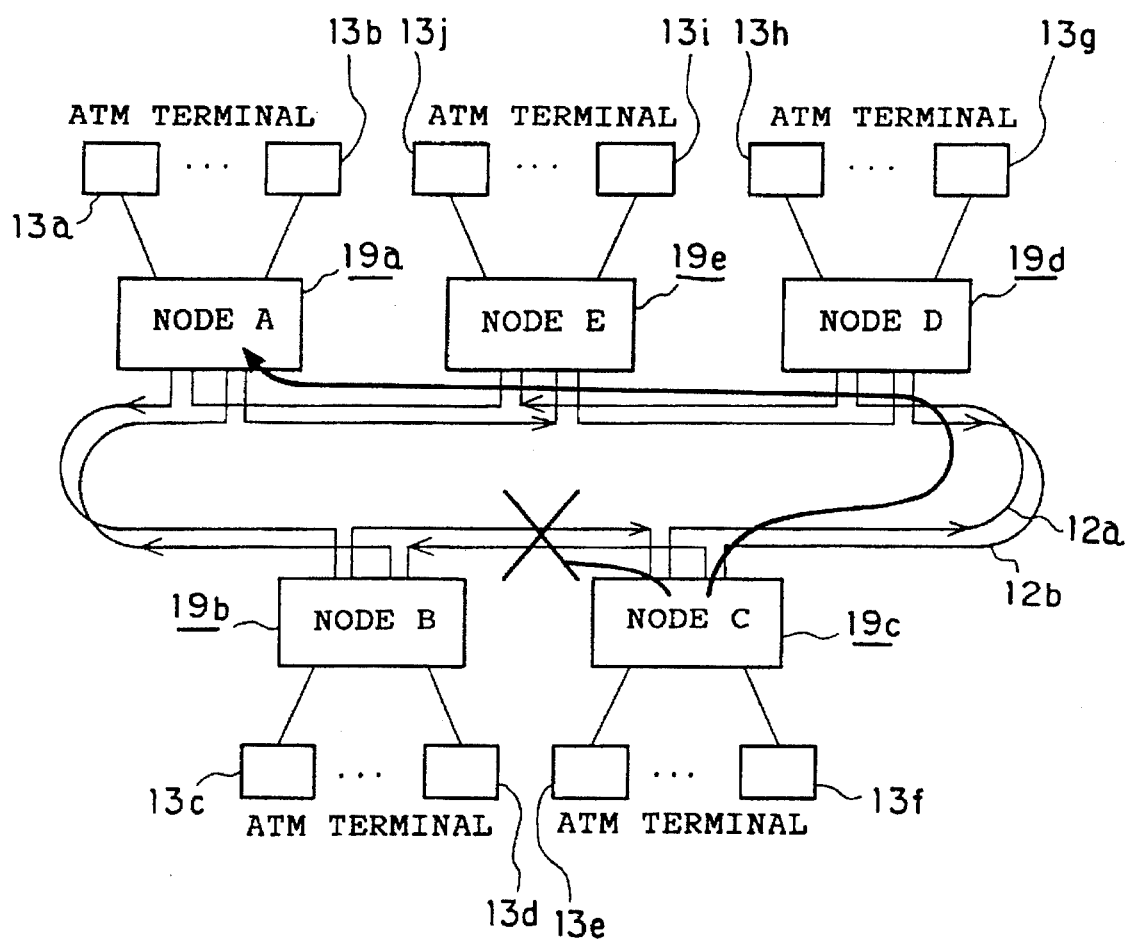
FIG. 16 is a diagram of the configuration of the ring type ATM network system in the second embodiment of the present invention, illustrating a state in which a malfunction is caused in the network configuration in FIG. 9.

FIG. 15 is a VPI/VCI value-outgoing line corresponding table 36a set in the cell switch 22 in the node C shown in FIG. 12. The drawing illustrates a case where the number of the outgoing line identification is changed from #1 to #2. In FIG. 16 using the network configuration Of FIG. 9, a malfunction is caused between the node B and the node C so that the cell can not be transmitted therebetween, and the path from the node C to the node A is switched over to the stand-by system. The mark x shows occurrence of the malfunction.

Figure 17:
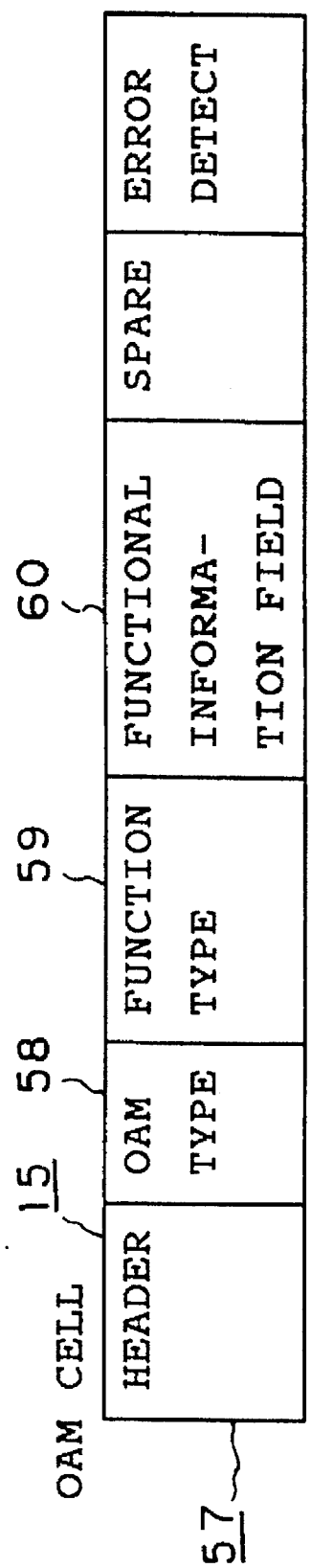
FIG. 17 is a diagram showing a format of an OAM cell transmitted between the node equipment used in the second, third, and fifth embodiments of the present invention.
Figure 38:
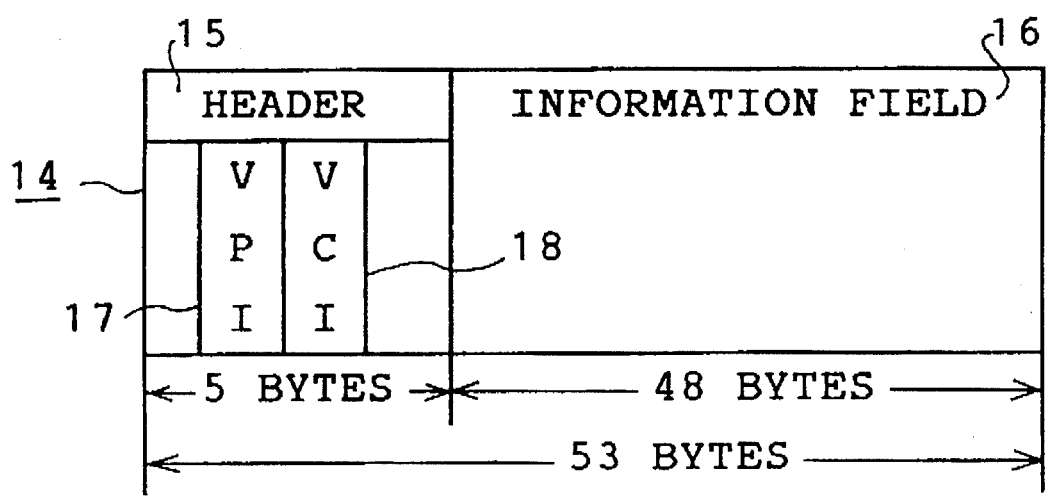
FIG. 38 is a diagram showing a cell format used in the prior art and in the present invention.

FIG. 17 is a diagram showing a format of an OAM (Operation and Maintenance) cell which is a type of cell shown in FIG. 38. In the drawing, reference numeral 57 means the OAM cell for network management, 58 is an OAM type showing a type of management, 59 is a function type showing a type of function executed under the management shown by the OAM type 58, and 60 is a functional information field containing information for each type of function. It is identified depending upon information in the header 15 that the cell is the OAM cell.

A description will now be given of the operation. Information in the VPI value assignment table 50 in FIG. 14 is held by all the node equipments 19, and information in the VPI value [node C] allocation table 53 is held by the node C. When a malfunction position in the ring is posted, it is possible to find the destination node equipment 19 and a path which are affected in both the primary ring and the secondary ring, depending upon the ring format databases 42 and 46 and the node position information 45. Referring to the VPI value [node C] allocation table 53 depending upon the information, VPI values of the affected path and the stand-by system path are obtained to update the VPI/VCI value-outgoing line corresponding table 36, resulting in switching of the path.

The operation will be described by way of, as one example, switching of the path shown by the solid line and the broken line in the network configuration of FIG. 9. As can be seen from the VPI value [node C] allocation table 53, two VPI values of x'030' and x'031' can be allocated to the path from the node C to the node A. In the network configuration of FIG. 9, the value of x'031' is allocated to the solid line showing the path on the secondary ring, and the value of x'030' is allocated to the broken line showing the path on the primary ring. Therefore, in FIG. 12, the VPI/VCI value of a has the VPI value of x'031', and the VPI/VCI value of b has the VPI value of x'030'.

When a malfunction is caused between the node B and the node C and communication therebetween is prohibited as shown in FIG. 16, information associated with the malfunction is posted to all the node equipments 19. Subsequently, the malfunction information is set in the OAM cell 57 of FIG. 17, and is sent to all the node equipments 19. The OAM cell 57 has the OAM type 58 set to "failure manage," and the function type 59 is set to "AIS" or "FERF," or a discretely defined type. In the functional information field 60, there is set information showing, at least, whether the node equipment 19 detecting the malfunction and a failure position are on the primary ring or the secondary ring.

The node C receives the OAM cell 57, and refers to the ring format database 42 so as to find the destination node equipment 19 which is affected. It can be seen that the malfunction between the node C and the node B has an effect on no path on the primary ring 12a, and has an effect on all the path to the node equipments 19 on the secondary ring 12b. Next, the VPI value [node C] allocation table 53 is referred to find the VPI value of the affected path. The path x'031' to the node A passing through the secondary ring 12b is affected. In subsequent processing, since all paths passing through the secondary ring 12b are affected, the same processing is carried out for the paths to other node equipments 19. The ring access control 1 23a outputs the cell to the secondary ring 12b. Consequently, in order to find a virtual connection serving as a path switching target, an input value 40 providing an updated value 40 having the VPI value of x'031' is found by referring to the VPI/VCI conversion table 39a of the ring access control 1 23a in the node C shown in FIG. 12. Since the VPI/VCI value of a corresponds to the VPI value of x'031', it can be seen that switching of the virtual connection of x is necessary. Subsequently, for the purpose of switching to the path passing through the ring 12a, the VPI/VCI value-outgoing line corresponding table 36a in FIG. 12 is referred. The outgoing line identification 38 with the VPI/VCI value 37 of x is changed to #2 as shown in FIG. 15, and the path is thereby switched over to the primary ring 12a.

As set forth above, it is possible to identify the path provided between the node equipments depending upon the VPI value. As a result, the path can easily be switched over to the stand-by system path.

Figure 18:
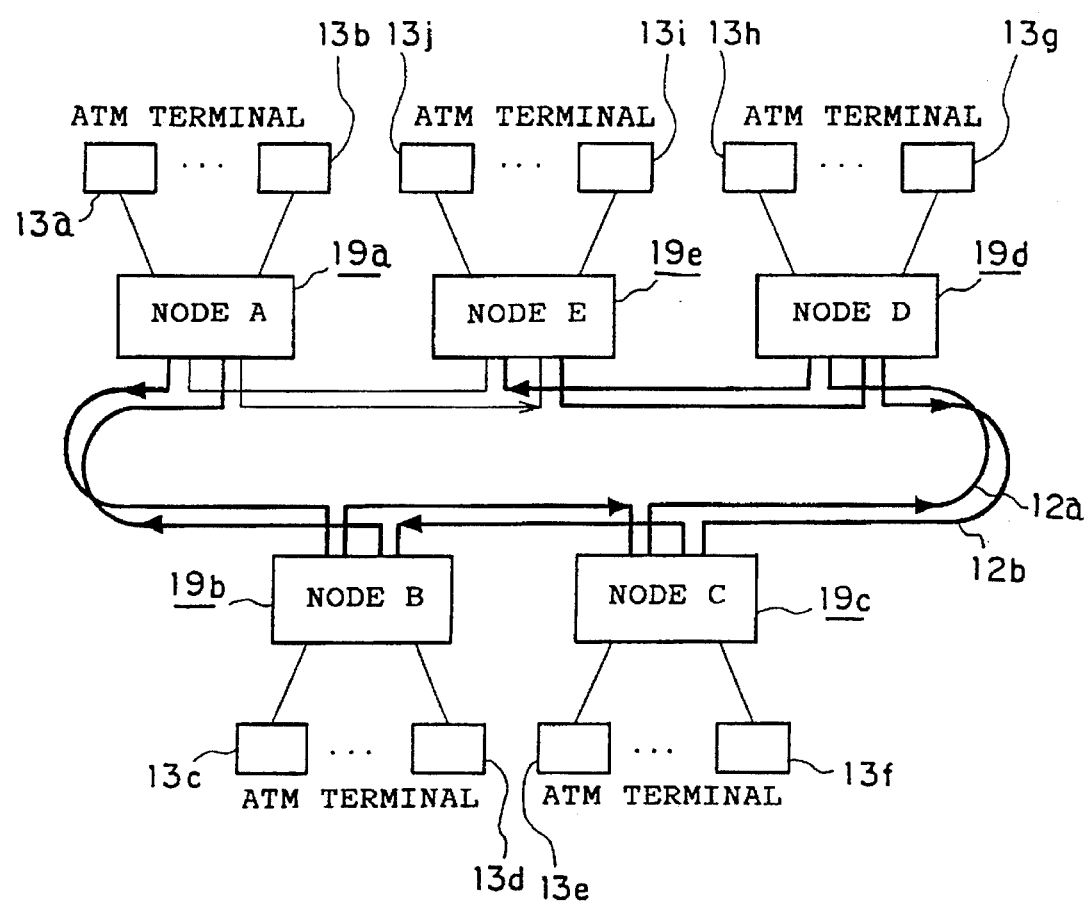
FIG. 18 is a diagram showing a configuration of the ring type ATM network system in the third embodiment of the present invention.

A description will now be given of the third embodiment of the present invention. FIG. 18 shows the network configuration of FIG. 9, illustrating a multicast cell transmitted through a path shown by the solid line. As shown in the drawing, during multicast of the cell, a dual ring 12 is regarded as two buses having logically opposed directions so that the multicast cell is not transmitted between specific node equipments 19. FIG. 18 shows that no multicast cell is transmitted between a node A and a node E.

Figure 19:
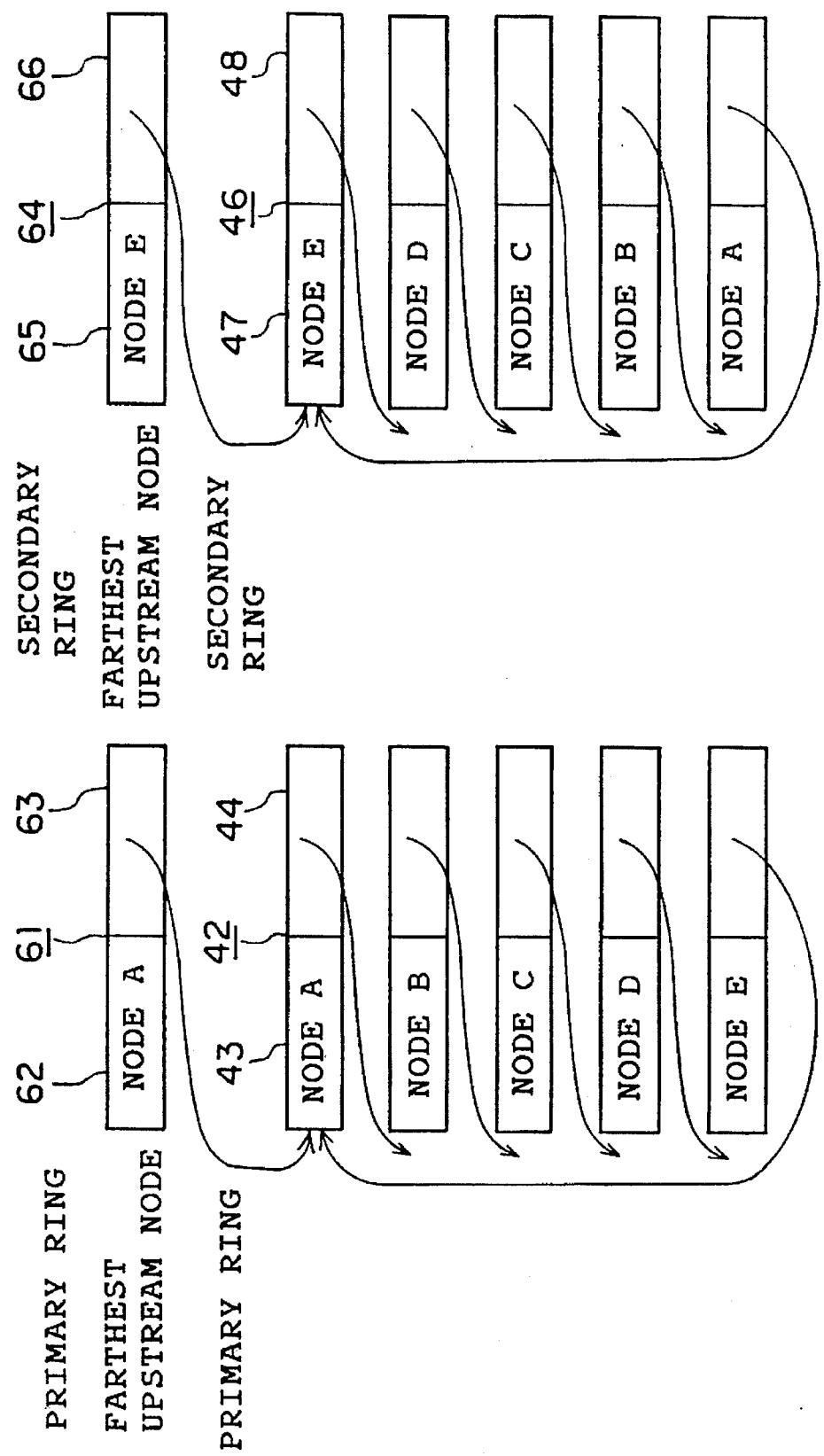
FIG. 19 is a diagram showing a ring format database and the farthest upstream node database which are stored in the node equipment used in the third and fifth embodiments of the present invention.

FIG. 19 is a database showing the farthest upstream node equipment 19 of the logical bus. In the drawing, reference numeral 61 means a primary ring farthest upstream node database showing the farthest upstream node equipment 19 of the logical bus in the primary ring, 64 is a secondary ring farthest upstream node database showing the farthest upstream node equipment 19 of the logical bus in the secondary ring, 62 and 65 are node identifiers to identify the farthest upstream node equipment 19, and 63 and 66 are pointers to the farthest upstream node equipment 19 in ring format databases 42 and 46.

Figure 20:
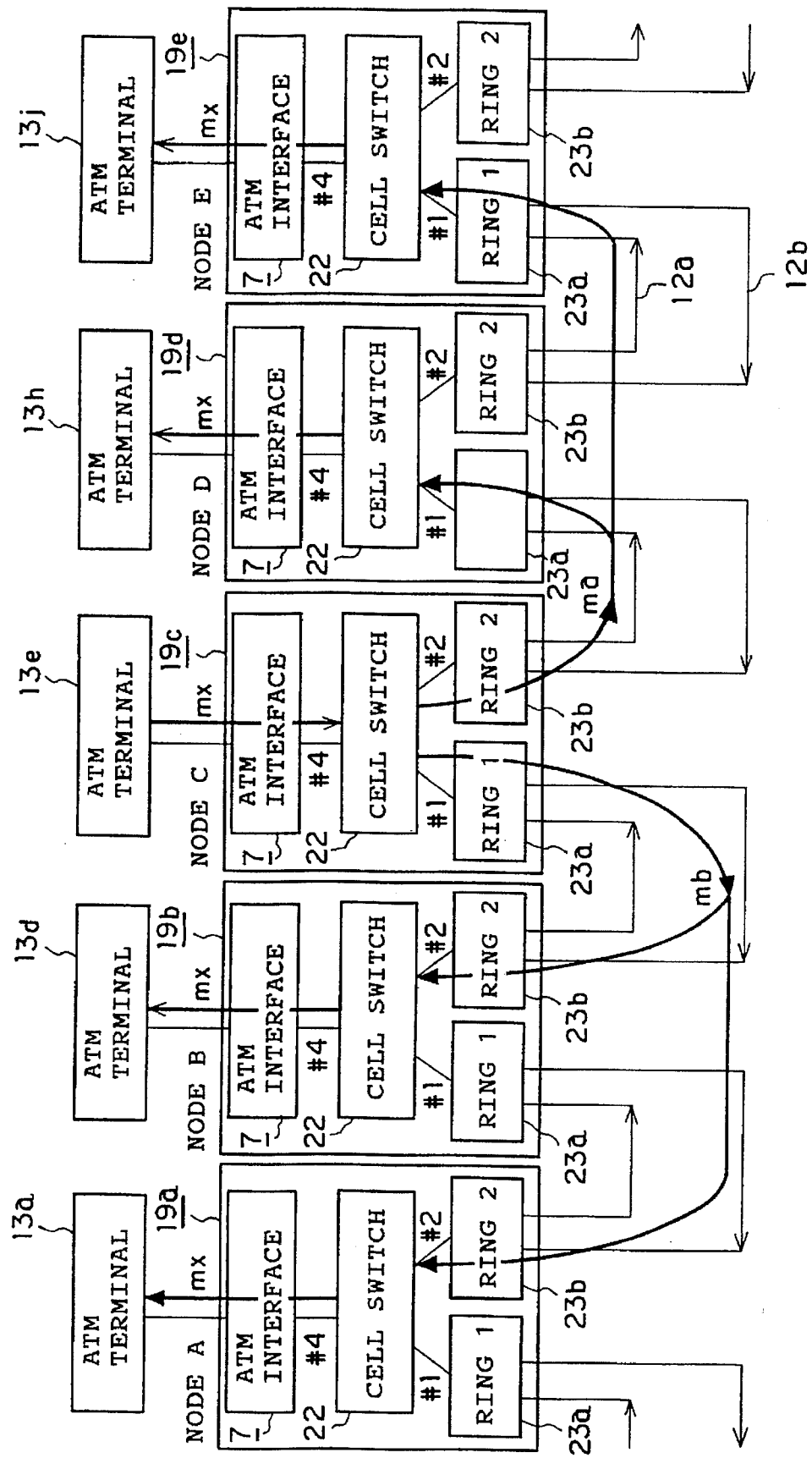
FIG. 20 is a diagram of a configuration of the ring type ATM network system in the third embodiment of the present invention, showing transmission from the node C.

FIG. 20 is a diagram in which an internal configuration of the node equipment 19 is partially added to the network configuration of FIG. 18, thereby providing a logical bus configuration. In the drawing, "mx," "ma," and "mb" are VPI/VCI values for multicast, and the solid lines show paths through which a cell is transmitted from an ATM terminal 13e connected to a node C for multicast.

FIG. 21 is a table used to register information of the cell serving as a multicast target cell in a cell switch 22. In the drawing, reference numeral 67 means a multicast registering table, 68 is a multicast VPI/VCI value serving as a VPI/VCI value to identify the multicast target cell, and 69 is an outgoing line identification to specify a line on which the cell switch 22 duplicates and places the multicast cell.

FIG. 22 is a diagram showing setting information required to provide the multicast path shown by the solid line in the network configuration of FIG. 20. In the drawing, reference numeral 67 means multicast registering tables registered in cell switches in the respective node equipments 19, and 39 is VPI/VCI conversion tables common to all the node equipments 19. In the drawing, reference numerals mx, ma, mb, #1, #2, and #4 are equivalent to those in FIG. 20.

Figure 23:
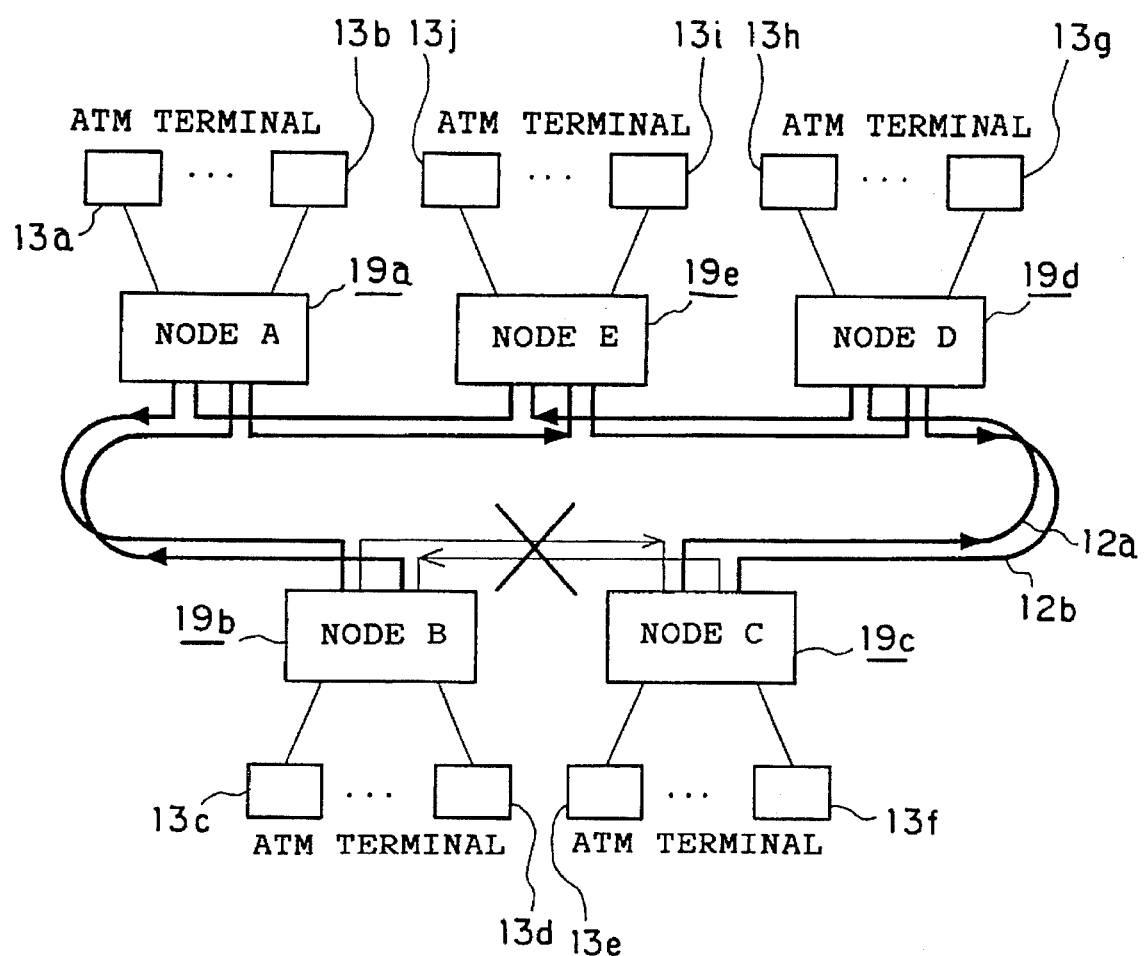
FIG. 23 is a diagram of the configuration of the ring type ATM network system in the third embodiment of the present invention, showing a state in which a malfunction is caused in the network configuration in FIG. 18.
Figure 24:
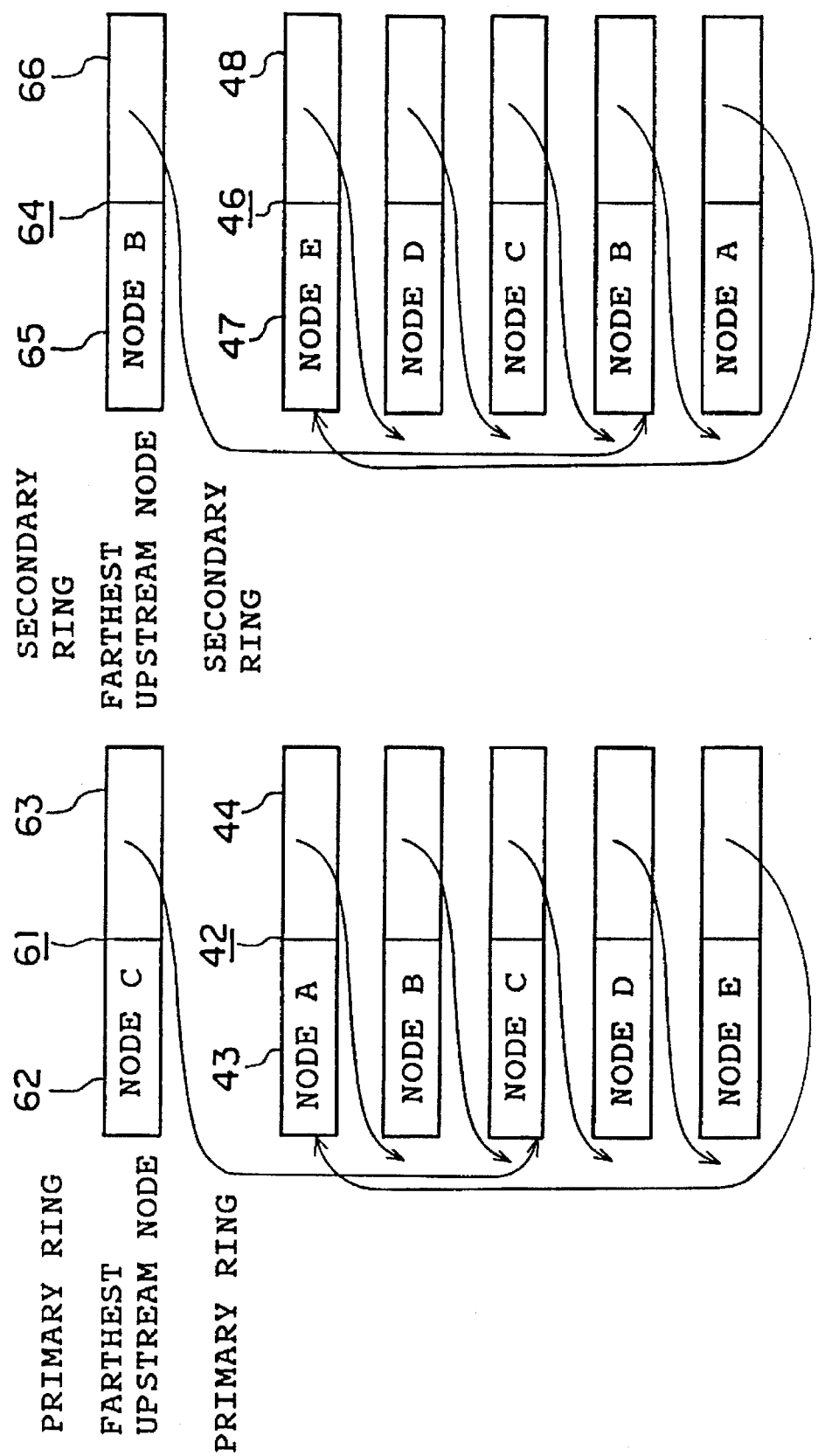
FIG. 24 is a diagram of the ring format database and the farthest upstream node database which are stored in the node equipment used in the third embodiment of the present invention, corresponding to the network configuration in FIG. 23.

In FIG. 23, in the network configuration in FIG. 18, an alternative path is shown by the solid line when a malfunction is caused between a node B and the node C to prohibit communication of the cell. In FIG. 24, the contents of FIG. 19 is changed according to modification of the network configuration of FIG. 18 into that of FIG. 23. In FIG. 25, the contents of FIG. 22 is changed according to the modification of the network configuration of FIG. 18 into that of FIG. 23. In this case, FIG. 25 shows only the contents obtained by modifying those of FIG. 22.

A description will now be given of the operation. Like the VPI/VCI value-outgoing line corresponding table 36, the multicast registering table 67 shown in FIG. 21 contains information set in the cell switch 22. When the cell having the set multicast VPI/VCI value 68 is inputted, the cell switch 22 places a copy of the cell on a line set to the outgoing line identification 69. It is possible to set a plurality of outgoing lines to the outgoing line identification 69. The following discussion shows that the paths shown by the solid lines in FIGS. 18 and 20 are configured according to the setting shown in FIG. 22.

A description will now be given of a procedure for transmitting a cell through the solid line path shown in FIG. 20. The cell having the VPI/VCI value of mx is transmitted from the ATM terminal 13e, and is received by an ATM interface in the node C so as to be inputted into a cell switch 22. The cell switch 22 refers to a multicast registering table 67c, and places the cell on outgoing lines #1 and #2 since the multicast VPI/VCI value 68 is mx. When the cell is inputted into a ring access control 2 23b connected to the line #2, a VPI/VCI conversion table 39e is referred. An input value 40 is mx so that the VPI/VCI value is changed into ma, and thereafter the cell is transmitted to the primary ring 12a. On the other hand, when the cell is inputted into a ring access control 1 23a connected to the line #1, a VPI/VCI conversion table 39d is referred. The input value 40 is mx so that the VPI/VCI value is changed into mb, thereafter the cell is transmitted to the secondary ring 12b.

A node D receives the cell having the VPI/VCI value of ma from the primary ring 12a, and the cell is inputted into a cell switch 22. The cell switch 22 refers to a multicast registering table 67d, and places the cell on the outgoing lines #2 and #4 since the multicast VPI/VCI value 68 is ma. The ring access control 2 23b connected to the line #2 directly transmits the cell with the VPI/VCI value of ma to the primary ring 12a. Further, the ATM interface 7 connected to the line #4 refers to a VPI/VCI conversion table 39f, and transmits the cell to an ATM terminal 13h after the VPI/VCI value is modified into mx. The node E receives the cell having the VPI/VCI value of ma from the primary ring, and the cell is inputted into a cell switch 22. The cell switch 22 refers to a multicast registering table 67e, and places the cell on only an outgoing line #4 since the multicast VPI/VCI value 68 is ma. Hence, the cell is not transmitted to the subsequent downstream node equipments 19. An ATM interface 7 connected to the line #4 refers to the VPI/VCI conversion table 39f, and transmits the cell to an ATM terminal 13j after the VPI/VCI value is modified into mx.

The node B receives the cell having the VPI/VCI value of mb from the secondary ring 12b, and the cell is inputted into a cell switch 22. The cell switch 22 refers to a multicast registering table 67b, and places the cell on outgoing lines #1 and #4 since the multicast VPI/VCI value 68 is mb. A ring access control 1 23a connected to a line #1 directly transmits the cell with the VPI/VCI value of mb to the secondary ring 12b. Further, an ATM interface 7 connected to the line #4 refers to the VPI/VCI conversion table 39f, and transmits the cell to an ATM terminal 13d after the VPI/VCI value is modified into mx. The node A receives the cell having the VPI/VCI value of mb from the secondary ring, and the cell is inputted into a cell switch 22. The cell switch 22 refers to a multicast registering table 67a, and places the cell on only an outgoing line #4 since the multicast VPI/VCI value 68 is mb. Hence, the cell is not transmitted to subsequent downstream node equipments 19. The ATM interface 7 connected to the line #4 refers to the VPI/VCI conversion table 39f, and transmits the cell to an ATM terminal 13a after the VPI/VCI value is modified into mx. The above operation is similarly carried out even when the ATM terminal 13 connected to another node equipment 19 transmits a cell having the VPI/VCI value of mx.

In FIG. 19, the node A is set in the primary ring farthest upstream node database 61, and the node E is set in the secondary ring farthest upstream node database 64. The node A is disposed in the farthest upstream of the secondary ring 12b, and the node E is disposed in the farthest downstream thereof. The node E is disposed in the farthest upstream of the secondary ring 12b, and the node A is disposed in the farthest downstream thereof. Setting in the multicast registering table 67e permits no transmission of a multicast cell to the downstream of the node E in the primary ring 12a. Setting in the multicast registering table 67a permits no transmission of a multicast cell to the downstream of the node A in the secondary ring 12b. In FIG. 18, a path is shown by the solid line through which the multicast cell is transmitted and received on the rings 12. As shown in FIG. 23, when a malfunction is caused between the node B and the node C to prohibit communication of the cell, the multicast cell is transmitted and received through a path shown by the solid line. For the purpose of switching of the path, setting information are changed to those shown in FIGS. 24 and 25 in the respective node equipments 19.

As shown in FIG. 23, when the malfunction is caused between the node B and the node C to prohibit the communication between the node equipments 19, information associated with the malfunction is posted to all the node equipments 19. Malfunction information is set in the OAM cell 57 shown in FIG. 17, and is sent to all the node equipments 19. The node equipment 19 receives the OAM cell 57, and refers to the primary ring format database 42 for switching of the farthest upstream node equipment 19. The node C disposed adjacently in the downstream of a malfunction position is set in the primary ring farthest upstream node database 61 as the farthest upstream node equipment so as to modify a pointer. Subsequently, the secondary ring format database 46 is referred. The node B disposed adjacently in the downstream of the malfunction position is set in the secondary ring farthest upstream node database 64 as the farthest upstream node equipment 19 so as to modify a pointer. FIG. 24 shows the result of modification. Further, according to the modification of the farthest upstream node equipment 19, the multicast registering tables 67 of the respective node equipments 19 are changed from those in FIG. 22 to those shown in FIG. 25. The modification includes a stop operation of transmission of the multicast cell in a downstream direction in the node B disposed in the farthest downstream of the primary ring 12a, a stop operation of transmission of the multicast cell in a downstream direction of the node C disposed in the farthest downstream of the secondary ring, and a relay start operation of the multicast cell at the nodes A and E serving as intermediate node equipments 19.

As set forth above, the two rings 12 are regarded as the two buses through which the cell can logically be transmitted from the upstream to the downstream, and the two paths having different VPI/VCI values are provided on the two buses. Thus, a multicast cell transmitted from a specific node equipment passes through the two paths, and the cell can be transmitted to all the node equipments 19 only once. The multicast is implemented by providing the procedure for the node equipment 19.

Figure 26:
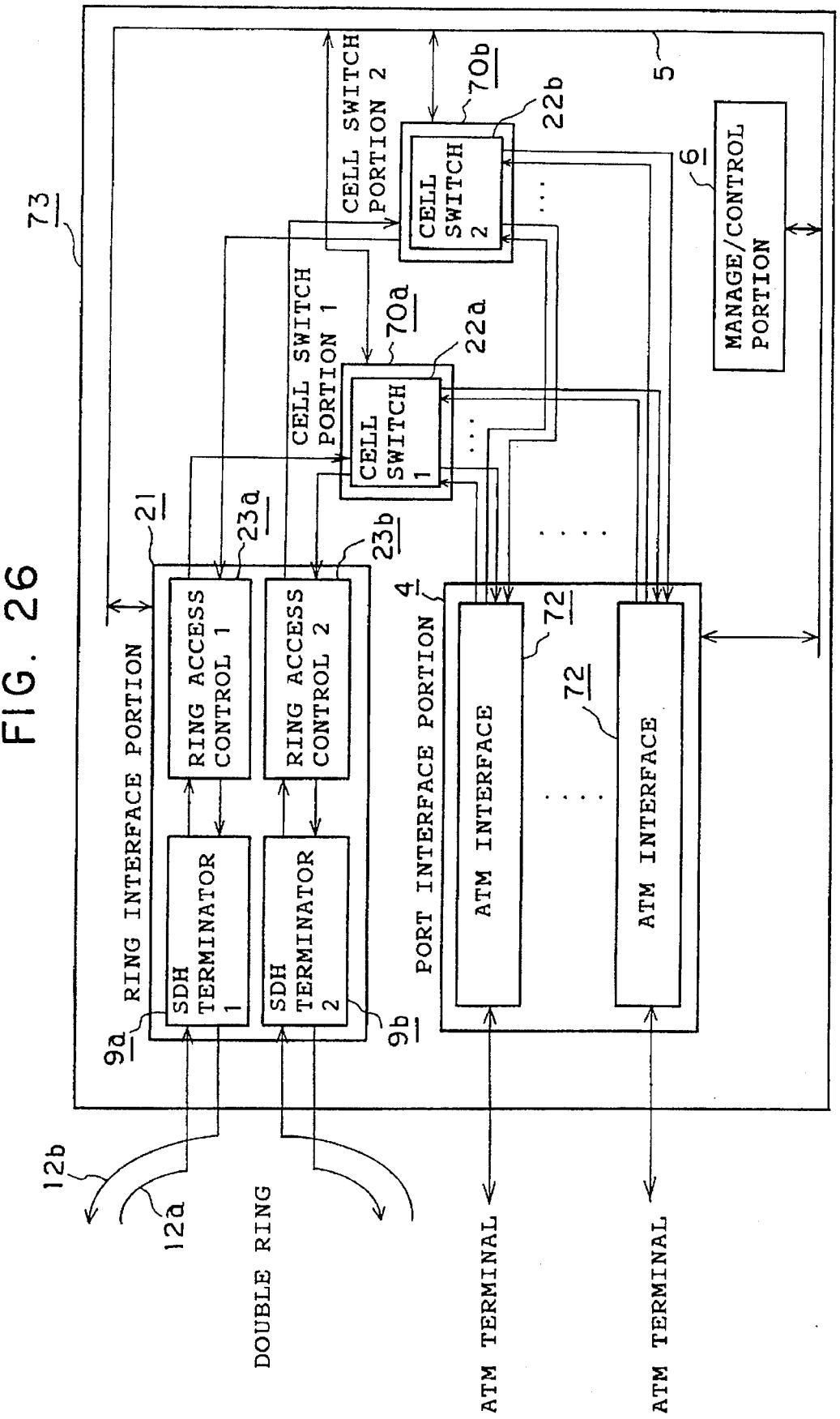
FIG. 26 is a diagram showing a configuration of the node equipment used in the fourth and fifth embodiments of the present invention.
Figure 27:
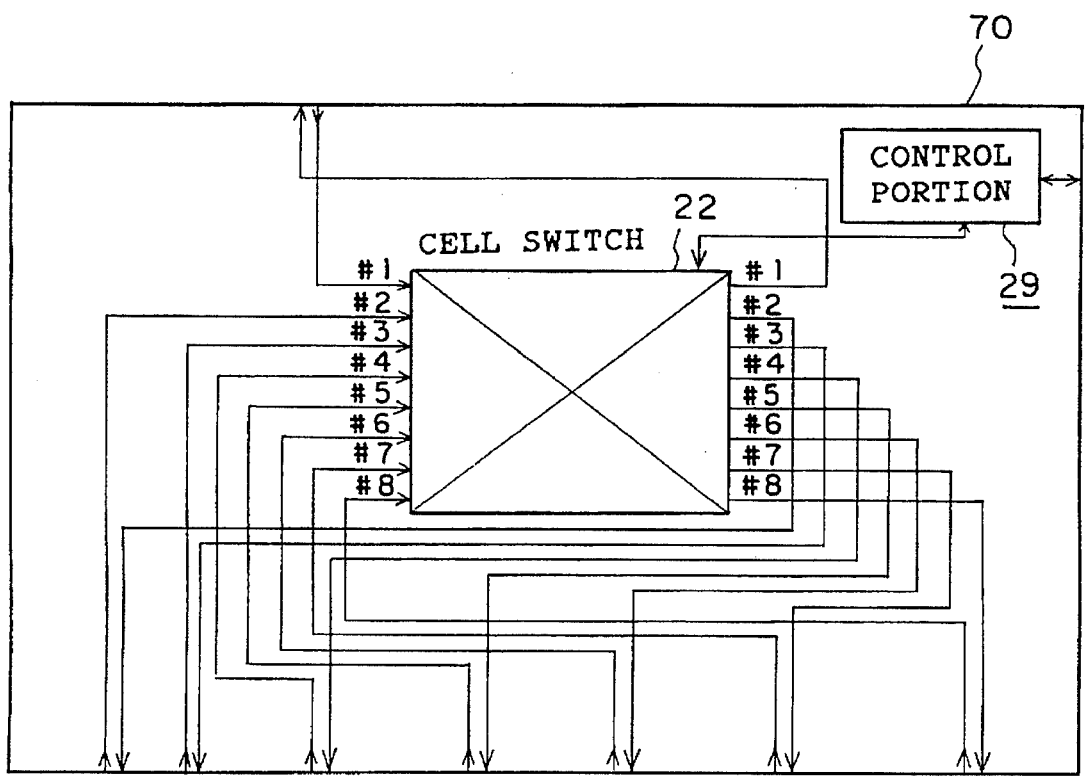
FIG. 27 is a diagram showing a configuration of a cell switch portion which is mounted in the node equipment used in the fourth and fifth embodiments of the present invention.
Figure 28:
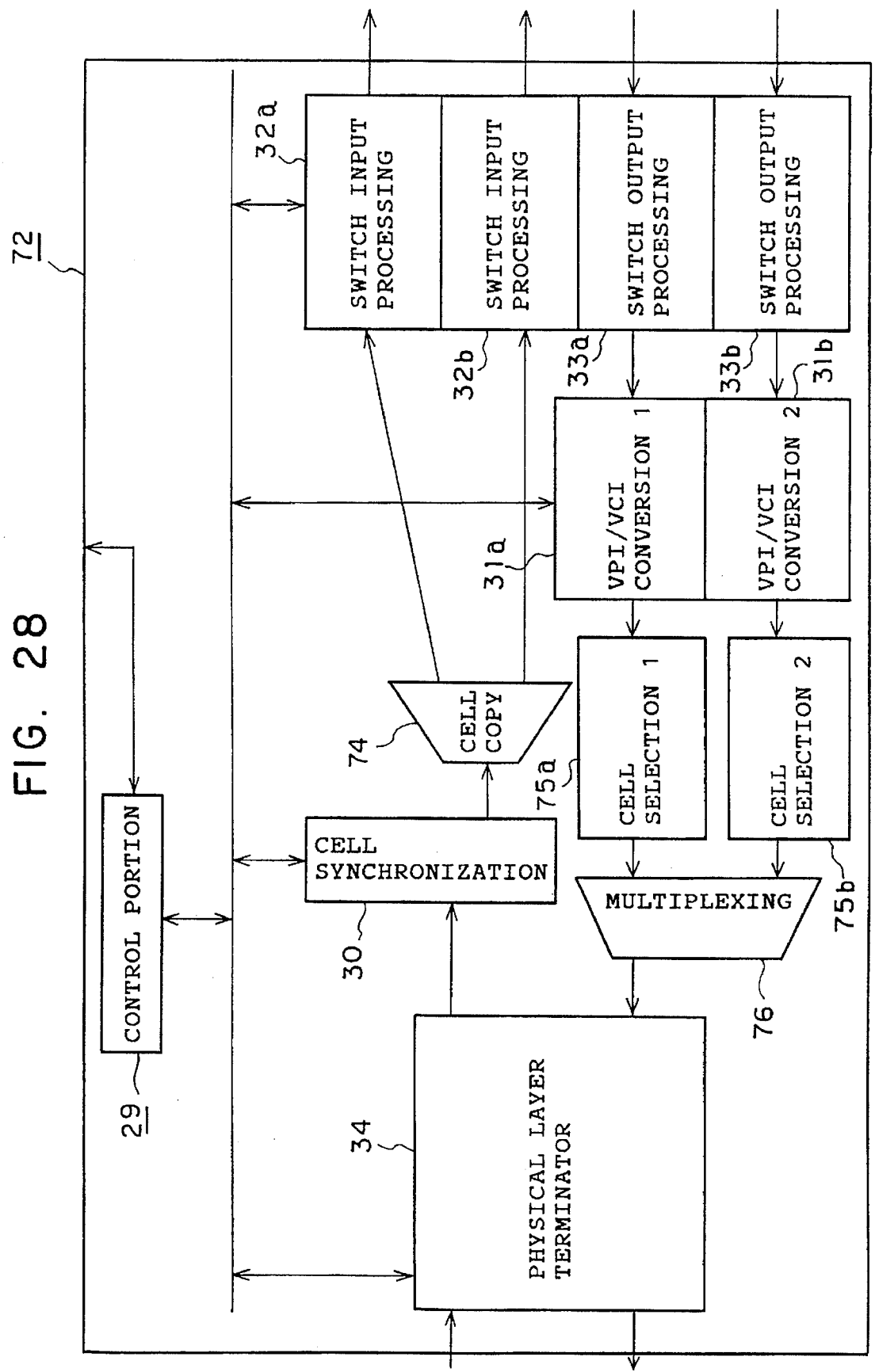
FIG. 28 is a diagram showing a configuration of an ATM interface which is mounted in the node equipment used in the fourth and fifth embodiments of the present invention.

A description will now be given of the fourth embodiment of the present invention. FIG. 26 is a diagram showing a configuration of a node equipment in the ring type ATM network system of the present invention. In the drawing, reference numeral 73 means the node equipment, 70 is cell switch portions to exchange a cell, and 72 is ATM interfaces employing a procedure for communication with ATM terminals, to transmit and receive the cell. FIG. 27 is a diagram showing a configuration of the cell switch portion 70. Since the cell switch portion 70 is duplicated, one cell switch portion is connected to a ring interface portion 21 through a pair of input-output lines. FIG. 28 is a diagram showing a Configuration of the ATM interface 72. In the drawing, reference numeral 74 means a cell copy to duplicate the cell received from an ATM terminal 13 so as to provide two copies, 75 is cell selections to discard, among cells outputted from a cell switch 22, a cell to which a discard mark is attached in a VPI/VCI conversion 31, and 76 is a multiplexing circuit to store and multiplex the cell outputted from the two cell selections 75.

Figure 29:
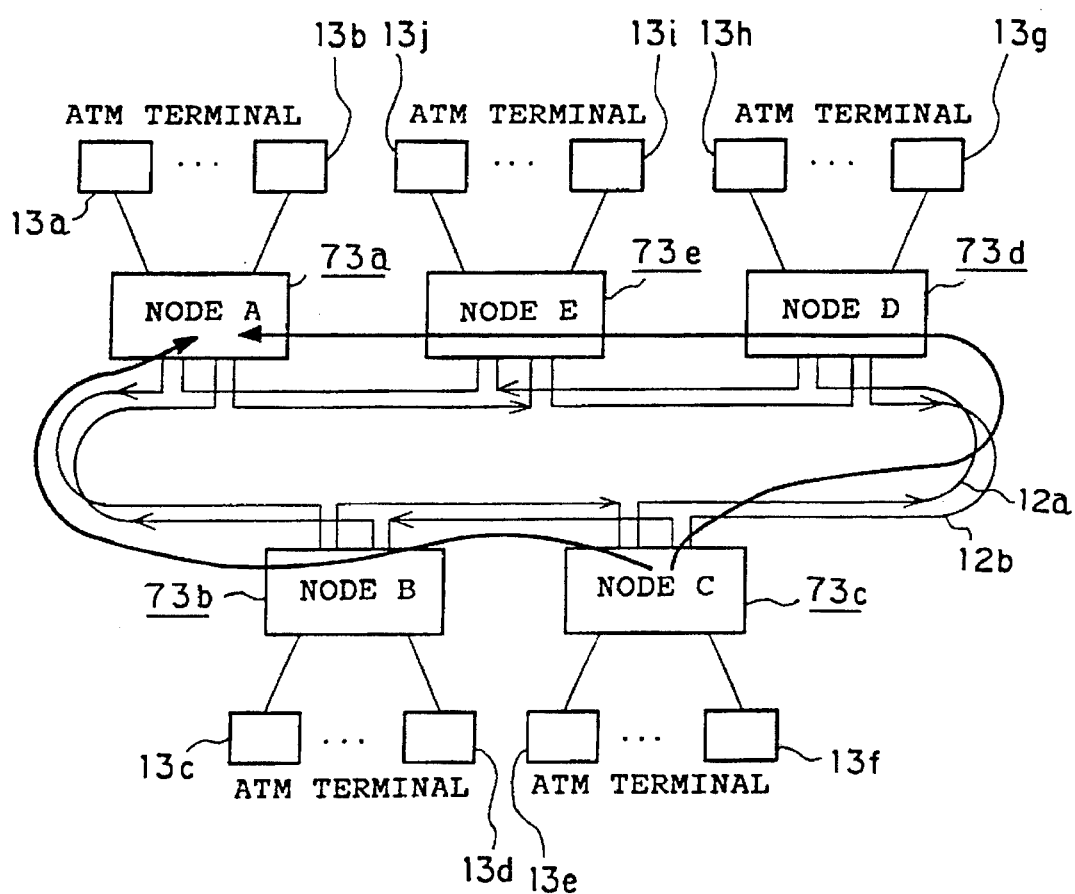
FIG. 29 is a diagram showing a configuration of a ring type ATM network system in the fourth embodiment of the present invention.
Figure 30:
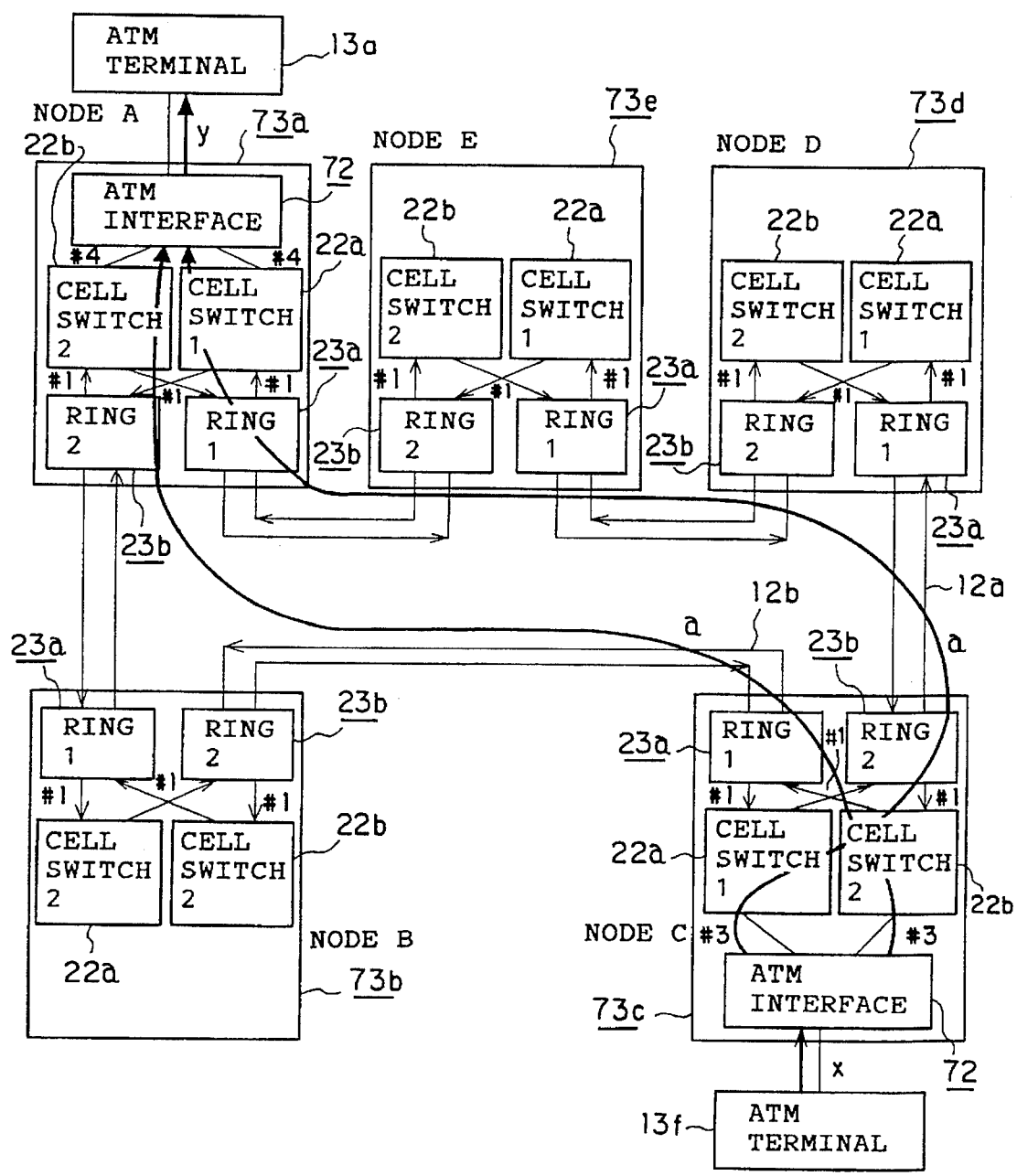
FIG. 30 is a diagram of the configuration of the ring type ATM network system in the fourth embodiment of the present invention, showing a more specific configuration than that in FIG. 29.

FIG. 29 is a diagram of a network configuration using node equipment 73. In the drawing, there are two paths shown by the solid lines from a node C to a node A. FIG. 30 is a diagram in which an internal configuration of the node equipment 73 is partially added to the network configuration shown in FIG. 29. In the drawing, reference numerals #1 to #4 mean input-output lines for cell switches 22, x and y are VPI/VCI values between the ATM terminals 13 and the ATM interfaces 72, and a VPI/VCI value is set to "a" between the node equipments 73. In the drawing, "a ring 1" is equivalent to "a ring access control 1," and "a ring 2" is equivalent to "a ring access control 2." FIG. 31 shows information set in VPI/VCI value-outgoing line corresponding tables 36 and VPI/VCI conversion tables 39, and used to configure the paths shown by the solid lines in FIG. 30. In the drawing, reference numerals x, y, a, #1, and #4 are equivalent to those in FIG. 30, and a mark x means a command to discard a cell in the cell selection 75.

A description will now be given of the operation. In FIG. 30, the paths from the ATM terminal 13f to the ATM terminal 13a are shown by the solid lines. One path having a VPI/VCI value of x is set between the node C and the ATM terminal 13f, and another path having a VPI/VCI value of y is set between the node A and the ATM terminal 13a. From the node C to the node A, there are the two paths passing through a primary ring 12a and a secondary ring 12b. The two paths have a VPI/VCI value of a which is constant in all the node equipments 73.

A description will now be given of a path configuration according to the setting information of FIG. 31 by way of, as one example, the paths between the node equipments 73 shown in FIG. 30. A path from the node C to the node A on the secondary ring 12b is configured as follows: When a cell outputted from a cell switch 2 22b in the node C to a ring access control 1 23a has a VPI/VCI value of x, a VPI/VCI conversion 31 in the ring access control 1 23a changes the VPI/VCI value of the cell to "a" according to a VPI/VCI conversion table 39g, and transmits the cell to the secondary ring 12b. The cell is transmitted through the secondary ring 12b, and is received by a ring access control 2 23b in a node B so as to be inputted into a cell switch 2 22b. The VPI/VCI value in the cell is "a" so that the cell switch 2 22b places the cell on the line #1 according to a VPI/VCI value-outgoing line corresponding table 36g. A ring access control 1 23a receives the cell to transmit the cell to the secondary ring 12b. The cell is transmitted through the secondary ring 12b, and is received by a ring access control 2 23b in the node A so as to be inputted into a cell switch 2 22b. Since the VPI/VCI value in the cell is "a," the cell switch 2 22b places the cell on a line #4 according to a VPI/VCI value-outgoing line corresponding table 36f.

Further, a path on the primary ring 12a from the node C to the node A is configured as follows: When a cell outputted from a cell switch 1 22a to a ring access control 2 23b in the node C has a VPI/VCI value of x, a VPI/VCI conversion 31 in the ring access control 2 23b changes the VPI/VCI value of the cell to "a" according to the VPI/VCI conversion table 39g, and transmits the cell to the primary ring 12a. The cell is transmitted through the primary ring 12a, and is received by a ring access control 1 23a in the node D so as to be inputted into a cell switch 1 22a. The VPI/VCI value in the cell is "a" so that the cell switch 1 22a places the cell on a line #1 according to the VPI/VCI value-outgoing line corresponding table 36g. A ring access control 2 23b receives the cell to transmit the cell to the primary ring 12a. The cell is transmitted through the primary ring 12a. The cell is similarly transmitted via a node E, and is received by a ring access control 1 23a in the node A so as to be inputted into a cell switch 1 22a. Since the VPI/VCI value in the cell is "a," the cell switch 1 22a places the cell on a line #4 according to the VPI/VCI value-outgoing line corresponding table 36f.

As set forth above, the two paths are configured on the dual ring 12 according to the setting in FIG. 31. A description will now be given of transmission of the cell between the ATM terminals 13 by way of FIG. 30 as one example. One path having the VPI/VCI value of x is set between the ATM terminal 13f and the node C, and another path having the VPI/VCI value of y is set between the node A and the ATM terminal 13a. The ATM terminal 13f sends the cell having the VPI/VCI value of x to the node C. The cell is received by the ATM interface 72 and is duplicated in the cell copy 74 so as to be sent to the cell switch 1 22a and the cell switch 2 22b. These cell switches refer to a VPI/VCI value-outgoing line corresponding table 36e so as to detect a term having the VPI/VCI value of x, and places the cell on the corresponding outgoing line #1. The cell passes through the two paths on the dual ring 12, and is placed on the line #4 via the cell switches 22a and 22b in the node A. The ATM interface 72 receives the cell via the two cell switches. The cell outputted from the cell switch 1 22a is inputted into a VPI/VCI conversion 1 31a in which the VPI/VCI value is changed to x according to a VPI/VCI conversion table 39h. The cell is inputted into a cell selection 1 75a which discards the cell having the VPI/VCI value of x. On the other hand, the cell outputted from the cell switch 2 22b is inputted into a VPI/VCI conversion 2 31b in which the VPI/VCI value is changed into y according to a VPI/VCI conversion table 39i. Since the VPI/VCI value is not x, a cell selection 2 75b sends the cell to the multiplexing 76. The cell is sent to the ATM terminal 13a via the multiplexing 76.

As set forth above, there are provided the two paths passing through the primary ring 12a and the secondary ring 12b between the node equipment 73 and the other node equipment 73. The cell is duplicated in the transmitting node equipment 73, and the same cell is transmitted through the two paths. The receiving node equipment 73 selects the path so as to define one of the paths as a current system and define the other path as a stand-by system, and receives only the cell from one of the paths. Hence, it is possible to select a path having a smaller number of passing node equipments 73 and having a reduced delay time for each combination of the respective node equipments 73. Further, even when the path is switched over to the stand-by system, a transmission delay is less than a time required for one cycle of the ring.

Figure 32:
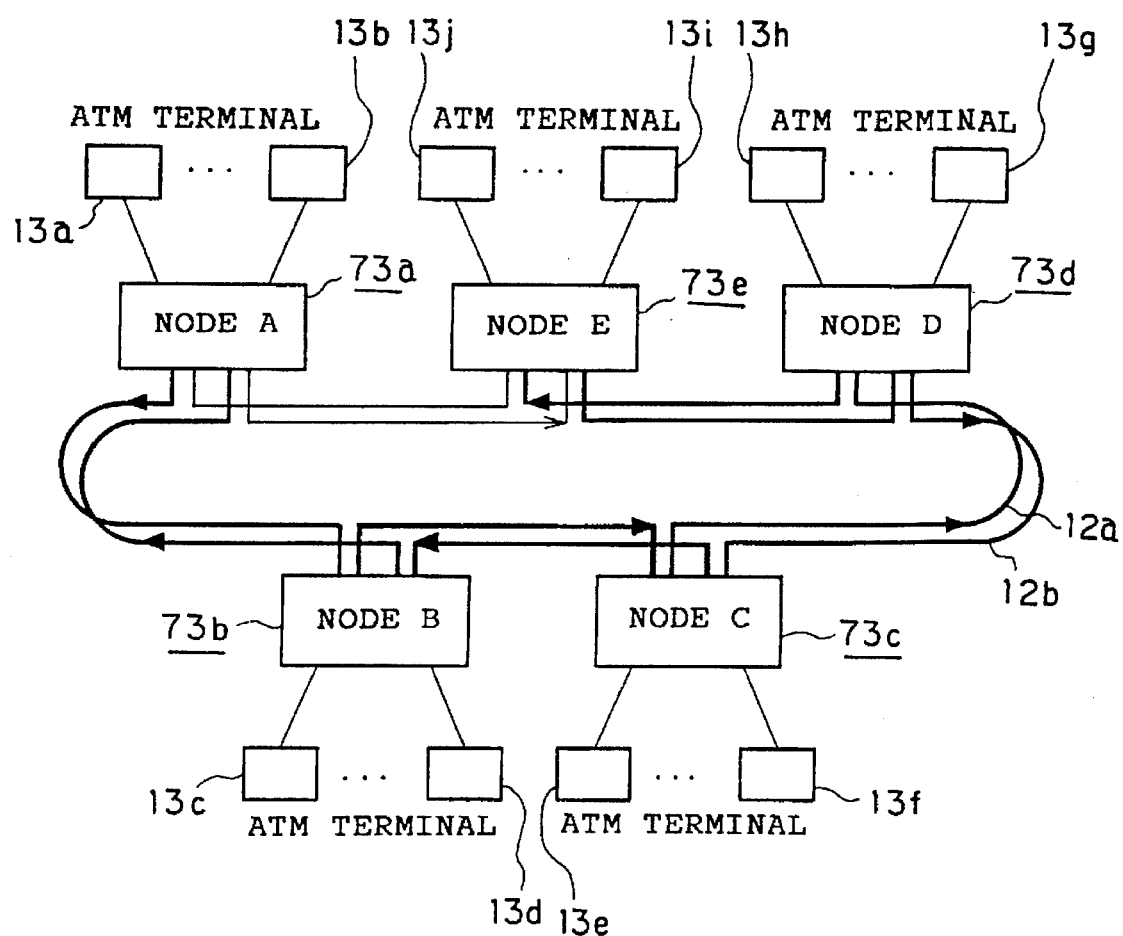
FIG. 32 is a diagram showing a configuration of a ring type ATM network system in the fifth embodiment of the present invention.

A description will now be given of the fifth embodiment of the present invention. FIG. 32 shows the network configuration of FIG. 29, illustrating a multicast cell transmitted through paths shown by the solid lines. As shown in the drawing, during multicast of a cell, a dual ring 12 is regarded as two buses having logically opposed directions. Since the ring is regarded as the bus according to the ring format databases and the farthest upstream node databases shown in FIG. 19, no multicast cell is transmitted between specific node equipments 73. FIG. 32 shows that no multicast cell is transmitted between a node A and a node E.

Figure 33:
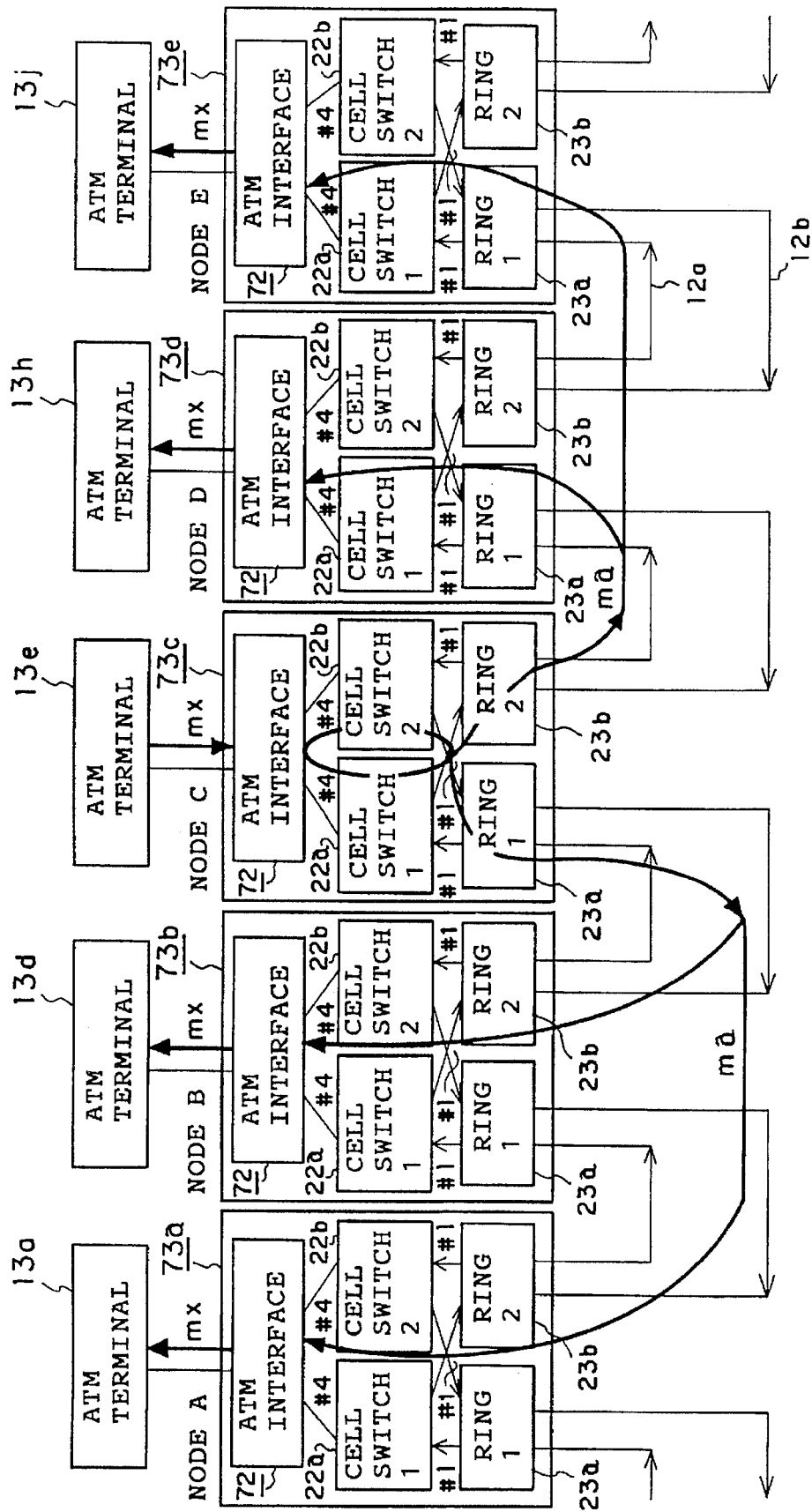
FIG. 33 is a diagram of a configuration of the ring type ATM network system in the fifth embodiment of the present invention, showing transmission from the node C.

FIG. 33 is a diagram in which an internal configuration of the node equipment 73 is partially added to the network configuration of FIG. 32, thereby providing a logical bus configuration. In the drawing, "mx" and "ma" are the VPI/VCI values for multicast, and the solid lines show paths through which a cell is transmitted for multicast from an ATM terminal 13e connected to a node C.

Figure 34:
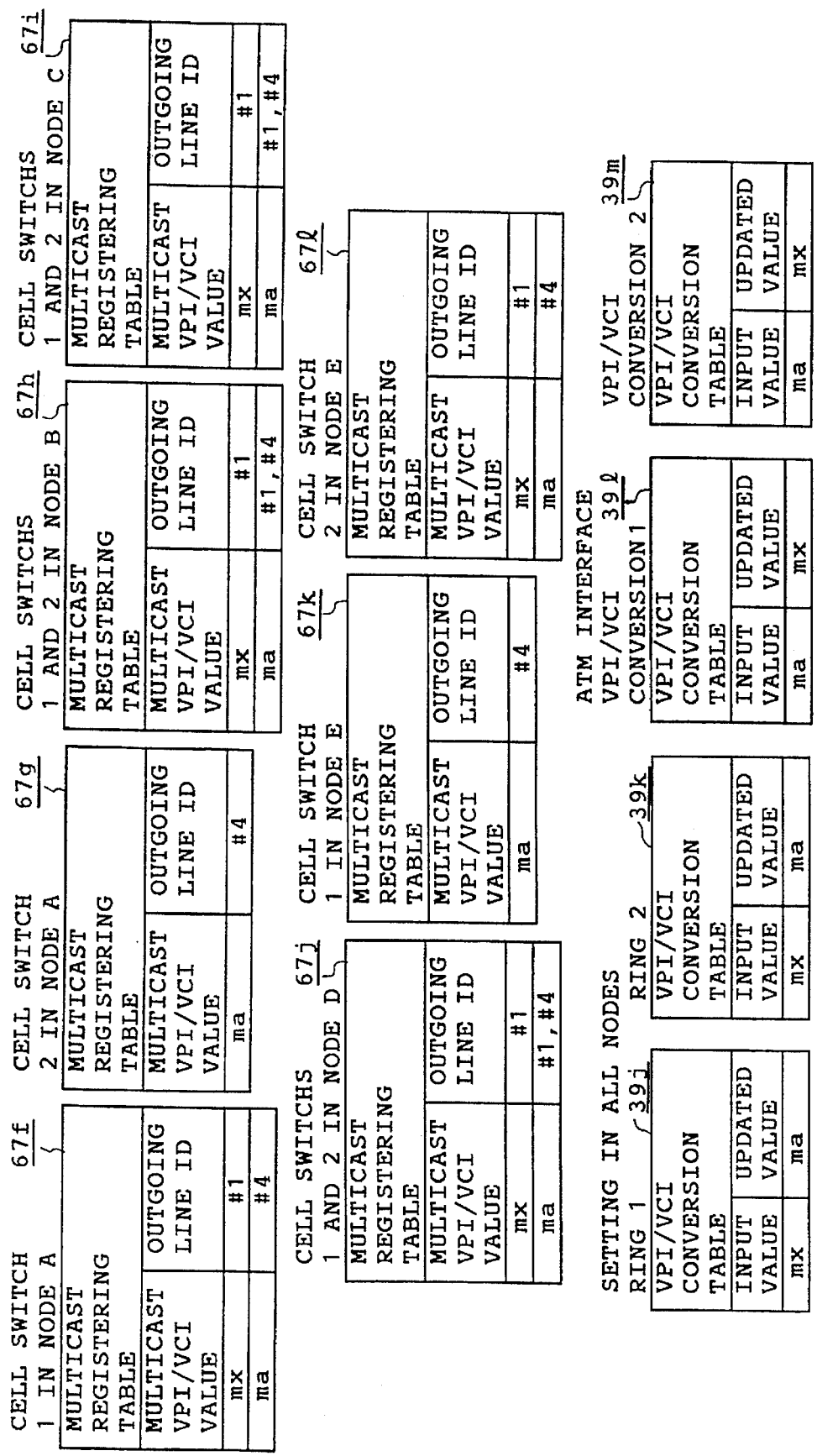
FIG. 34 is a diagram showing multicast registering tables and VPI/VCI conversion tables which are stored in the node equipment used in the fifth embodiment of the present invention, and contain setting information corresponding to the network configuration in FIG. 33.
Figure 35:
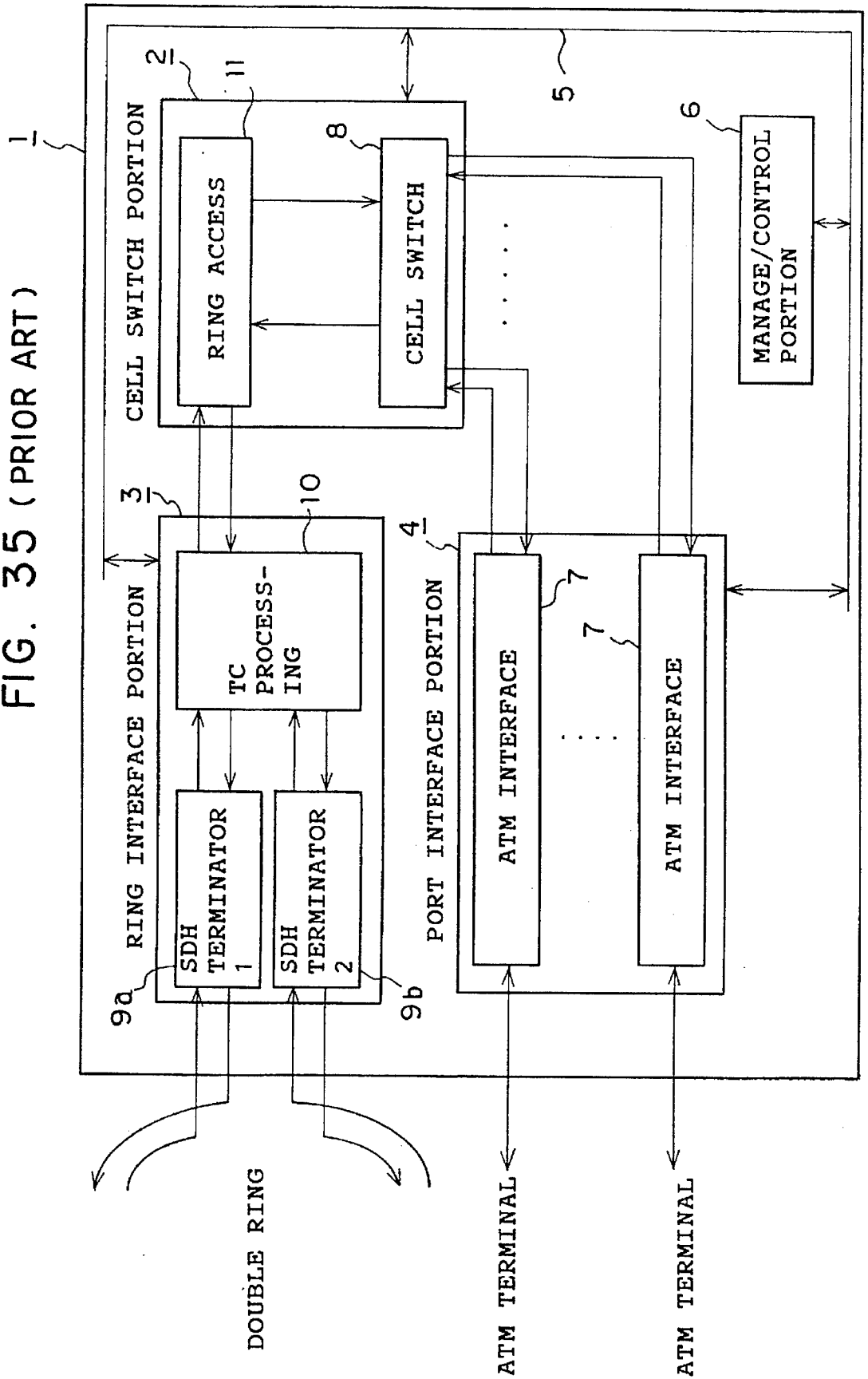
FIG. 35 is a diagram showing a configuration of a conventional node equipment.
Figure 36:
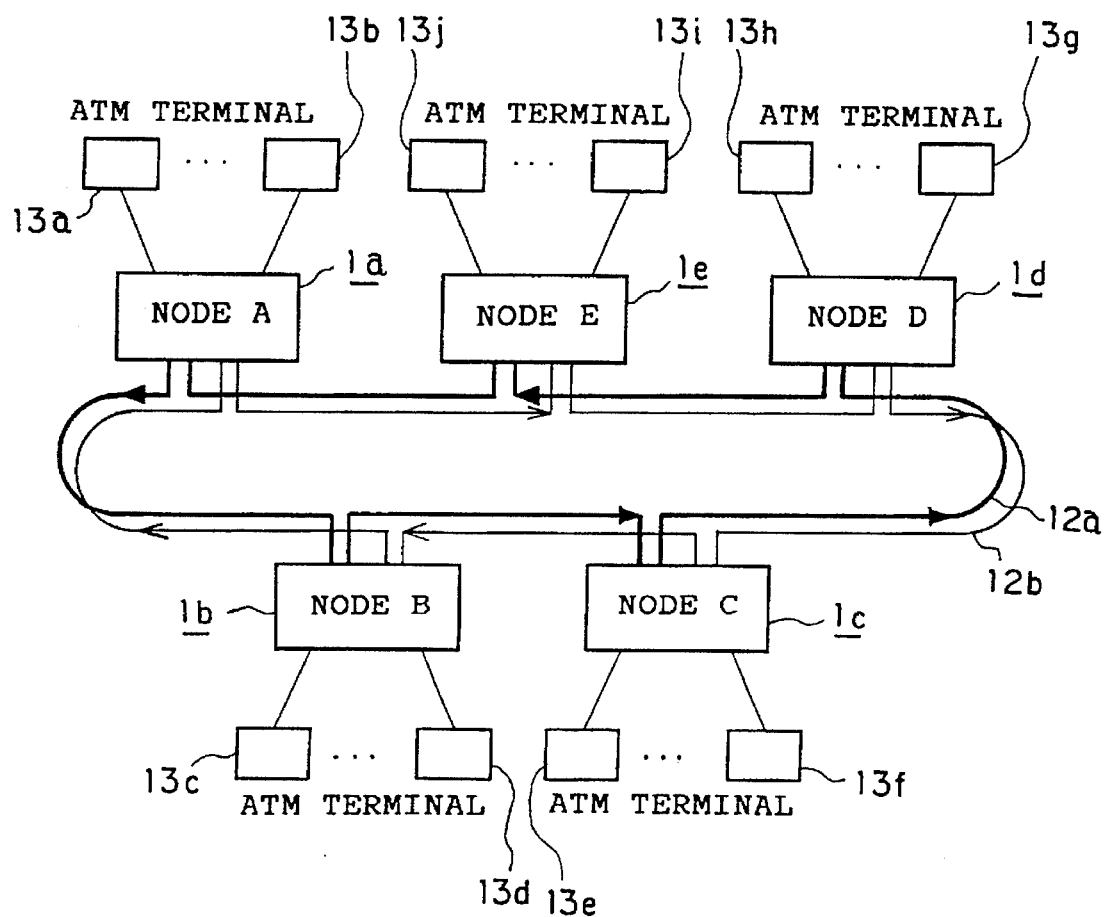
FIG. 36 is a diagram showing a configuration of a conventional ring type ATM network system.
Figure 37:
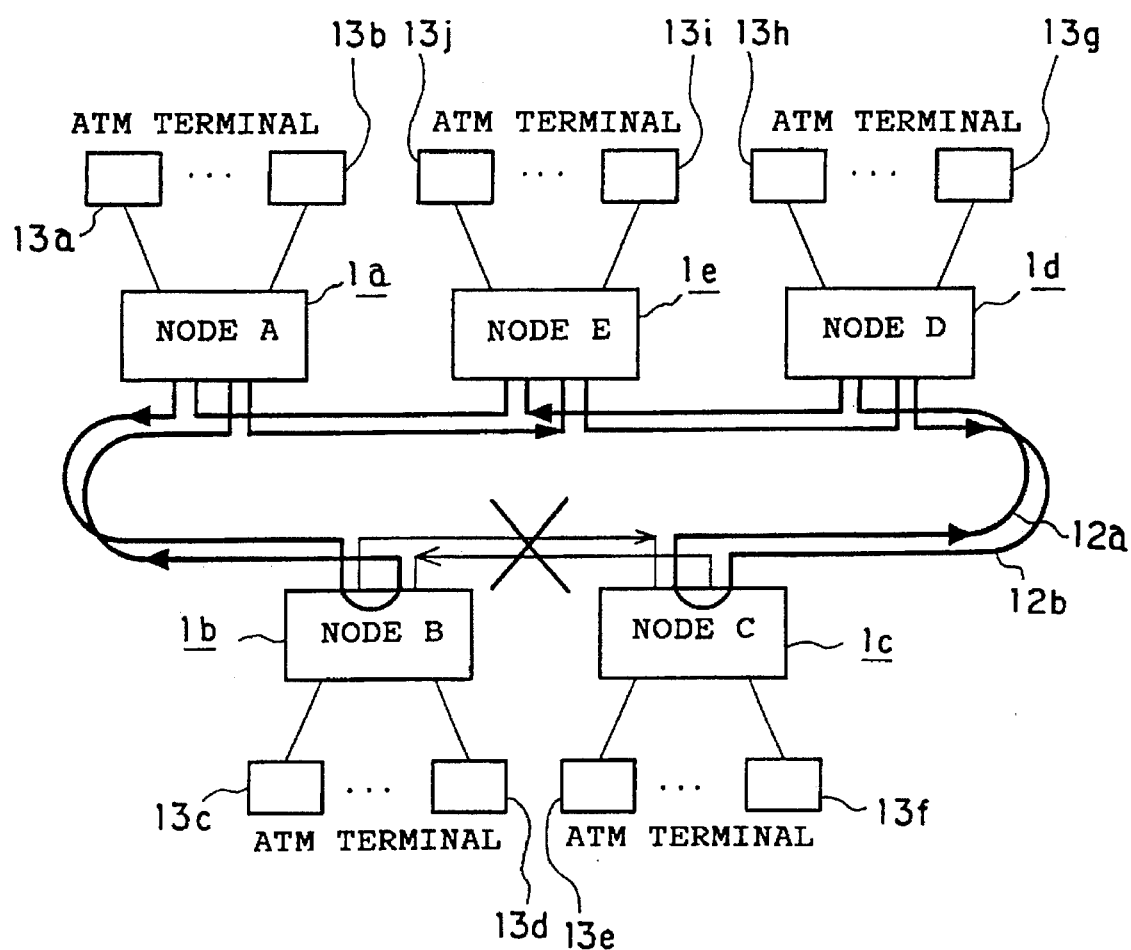
FIG. 37 is a diagram of the configuration of the conventional ring type ATM network system, illustrating a state in which a malfunction is caused in the network configuration in FIG. 36.

FIG. 34 is a diagram showing setting information required to provide the path for the multicast between ATM terminals 13 in the network configuration shown in FIG. 33. In the drawing, reference numeral 67 means multicast registering tables registered in cell switches 22 in the respective node equipments 73, and 39 is VPI/VCI conversion tables common to all the node equipments 73. In the drawing, reference numerals mx, ma, #1, and #4 are equivalent to those in FIG. 33.

A description will now be given of the operation. The following discussion shows that the paths shown by the solid lines in FIGS. 32 and 33 are configured according to setting shown in FIG. 34. A cell having a VPI/VCI value of mx is transmitted from the ATM terminal 13e so as to be received by an ATM interface 72 in the node C, and is duplicated in a cell copy 74 to be inputted into a cell switch 1 22a and a cell switch 2 22b. The cell switch 1 22a refers to a multicast registering table 67i, and places the cell on an outgoing line #1 since a multicast VPI/VCI value 68 is mx. When the cell is inputted into a ring access control 2 23b connected to output of the line #1, a VPI/VCI conversion table 39k is referred. An input value 40 is mx so that the VPI/VCI value is changed to ma, and the cell is transmitted to a primary ring 12a. On the other hand, the cell switch 2 22b refers to the multicast registering table 67i, and places the cell on the outgoing line #1 since the multicast VPI/VCI value 68 is mx. When the cell is inputted into a ring access control 1 23a connected to output of the line #1, a VPI/VCI conversion table 39j is referred. The input value 40 is mx so that the cell is transmitted to a secondary ring 12b after the VPI/VCI value is changed to ma.

A node D receives the cell having the VPI/VCI value of ma from the primary ring 12a, and the cell is inputted into a cell switch 1 22a. The cell switch 1 22a refers to a multicast registering table 67j, and places the cell on outgoing lines #1 and #4 since the multicast VPI/VCI value 68 is ma. A ring access control 2 23b connected to output of the line #1 directly transmits the cell with the VPI/VCI value of ma to the primary ring 12a. Further, an ATM interface 72 connected to a line #4 refers to a VPI/VCI conversion table 39l, and transmits the cell to an ATM terminal 13h after the VPI/VCI value is changed to mx. A node E receives the cell having the VPI/VCI value of ma from the primary ring 12a, and the cell is inputted into a cell switch 1 22a. The cell switch 1 22a refers to a multicast registering table 67k, and places the cell on only an outgoing line #4 since the multicast VPI/VCI value 68 is ma. Hence, the cell is never transmitted to the subsequent downstream node equipments 73. An ATM interface 72 connected to the line #4 refers to the VPI/VCI conversion table 39l, and transmits the cell to an ATM terminal 13j after the VPI/VCI value is changed to mx.

A node B receives the cell having the VPI/VCI value of ma from the secondary ring 12b, and the cell is inputted into a cell switch 2 22b. The cell switch 2 22b refers to a multicast registering table 67h, and places the cell on outgoing lines #1 and #4 since the multicast VPI/VCI value 68 is ma. A ring access control 1 23a connected to output of the line #1 directly transmits the cell with the VPI/VCI value of ma to the secondary ring 12b. Further, an ATM interface 72 connected to the line #4 refers to a VPI/VCI conversion table 39m, and transmits the cell to an ATM terminal 13d after the VPI/VCI value is changed to mx. A node A receives the cell having the VPI/VCI value of ma from the secondary ring 12b, and the cell is inputted into a cell switch 2 22b. The cell switch 2 22b refers to a multicast registering table 67g, and places the cell on only an outgoing line #4 since the multicast VPI/VCI value 68 is ma. Hence, the cell is never transmitted to the subsequent downstream node equipments 73. An ATM interface 72 connected to the line #4 refers to the VPI/VCI conversion table 39m, and transmits the cell to an ATM terminal 13a after the VPI/VCI value is changed to mx. The above operation is similarly carried out even when a cell having the VPI/VCI value of mx is transmitted from ATM terminals 13 connected to another node equipment 73.

As set forth above, the two rings 12 are regarded as the two buses through which the cell can logically be transmitted from the upstream to the downstream, and the two paths having the same VPI/VCI value are provided on the two buses. Thus, a multicast cell transmitted from a specific node equipment passes through the two paths, and the cell can be transmitted to all the node equipments 19 only once. The multicast is implemented by providing the procedure for the node equipment 73.

As stated above, according to the present invention, it is possible to provide many effects as will be discussed infra.

In the ring type ATM network system of the present invention, the two paths are provided between one node equipment and another node equipment to pass through the primary ring and the secondary ring, and the path is selected by the transmitting node equipment to define one path as the current system and define the other path as the stand-by system. As a result, it is possible to reduce a transmission delay, and select the path. It is also possible to select, as the current system, a path having a smaller number of passing node equipments for each combination of the node equipments.

Further, the path between the node equipments can be identified by the VPI value so that the path can easily be switched over to the current system or the stand-by system. In addition, at a time of occurrence of a malfunction, a path affected by the malfunction can be switched over to the stand-by system path in the transmitting node equipment depending upon the VPI value. As a result, the transmission delay can be reduced to a delay less than a time required for one cycle of the ring.

Further, the two rings are regarded as the two buses through which the cell is transmitted from the upstream to the downstream, and the two paths having different VPI/VCI values are provided on the two buses. Thus, a multicast cell transmitted from a specific node equipment passes through the two paths, and the cell can be transmitted to all the node equipments only once. As a result, the multicast of the cell can be implemented, and the transmission delay in the multicast can be reduced.

The two paths are provided between one node equipment and another node equipment to pass through the primary ring and the secondary ring. The transmitting node equipment transmits the same cell to the two paths. The receiving node equipment defines one path as the current system, and defines the other path as the stand-by system. Since the path is selected for each combination of the node equipments so as to receive the cell from one of the paths, it is possible to reduce the transmission delay. Further, it is possible to select the path, and it is also possible to select the path having a smaller number of passing node equipments as the current system for each combination of the node equipments.

Further, the two paths are provided between one node equipment and another node equipment to pass through the primary ring and the secondary ring. The transmitting node equipment duplicates the cell so as to transmit the same cell to the two paths. The receiving node equipment defines one path as the current system, and defines the other path as the stand-by system. The path is selected for each combination of the node equipments so as to receive the cell from one of the paths. As a result, it is possible to reduce a transmission delay, and select the path. It is also possible to select, as the current system, a path having a smaller number of passing node equipments for each combination of the respective node equipment.

Further, the two rings are regarded as the two buses through which the cell is transmitted from the upstream to the downstream. A multicast cell transmitted from a specific node equipment passes through the two paths, and the cell can be transmitted to all the node equipments only once. As a result, the multicast of the cell can be implemented, and the transmission delay in the multicast can be reduced.

What is claimed is:

1. In a ring type ATM network system having a plurality of node equipments interconnected through a dual ring including a primary ring and a secondary ring having mutually opposed directions, the ring type ATM network system comprising the steps of:

using a fixed-length cell having a combination of value of a virtual path and a virtual connection as an identifier;

setting two paths identified by an identifier of a cell corresponding to the respective directions of the dual ring between optional two node equipments; and regarding a specific node equipment on the dual ring as the farthest upstream node equipment in the primary ring and as the farthest downstream node equipment in the secondary ring, positioning the farthest downstream node equipment in the primary ring in the farthest upstream of the secondary ring, and storing as databases information associated with the order of the node equipments from the farthest upstream to the farthest downstream in the primary ring and the secondary ring;

wherein, at a time of multicast, a cell transmitting node equipment transmits a cell having the same data to the two paths, the node equipment positioned in the farthest downstream of both the rings depending upon the databases, instead of setting the virtual connection assigned for the multicast in a downstream direction of the ring, receiving the cell to refer to the identifier of the cell so as to transmit the cell to an ATM terminal via an ATM interface without relaying the cell, the receiving node equipment on the paths being set in a state in which the cell can be received from the two paths, and receiving the cell to refer to the identifier of the cell so as to relay the cell and transmit the cell to an ATM terminal via an ATM interface.

2. A ring type ATM network including a plurality of bode equipments interconnected through a dual ring including a primary ring and a secondary ring having mutually opposed directions, the ring type ATM network system comprising the steps of:

using a fixed-length cell having a combination value of a virtual path and a virtual connection as an identifier; and setting two paths identified by the identifier of a cell corresponding to the respective directions of the dual ring between optional two node equipments, and defining one of the two paths as a current system path and defining the other path as a stand-by system;

wherein a cell transmitting node equipment transmits the cell to both the current system path and the stand-by system path, a cell relaying node equipment relays the cell at a time of receiving the cell by referring to the identifier of the cell, and a cell receiving node equipment receives the cell by selecting one of the two paths including the current system path and the stand-by path so as to transmit only the one cell which is received on the selected one of the two paths to an ATM terminal via an ATM interface; and wherein a specific node equipment on the dual ring is regarded as the farthest upstream node equipment in the primary ring and as the farthest downstream node equipment in the secondary ring, the farthest downstream node equipment in the primary ring being positioned in the farthest upstream of the secondary ring, the primary ring and the secondary ring having as databases information associated with the order of the node equipments from the farthest upstream to the farthest downstream, the cell transmitting node equipment transmitting a cell having the same data to the two paths at a time of multicast, the node equipment positioned in the farthest downstream of both the rings, instead of setting the virtual connection assigned for the multicast in a downstream direction of the ring, receiving the cell to refer to the identifier of the cell so as to transmit the cell to an ATM terminal via an ATM interface without relaying the cell, the receiving node equipment on the paths being set in a state in which the cell can be received from the two paths, and receiving the cell to refer to the identifier of the cell so as to relay and transmit the cell to an ATM terminal via an ATM interface.

3. A ring type ATM network system including a plurality of node equipments interconnected through a dual ring including a primary ring and a secondary ring having mutually opposed directions, the ring type ATM network system comprising the steps of:

using a fixed-length cell having a combination value of a virtual path and a virtual connection as an identifier; and setting two paths identified by the identifier of a cell corresponding to the respective directions of the dual ring between optional two node equipments, and defining one of the two paths as a current system path and defining the other path as a stand-by system;

wherein a cell transmitting node equipment transmits the cell to both the current system path and the stand-by system path, a cell relaying node equipment relays the cell at a time of receiving the cell by referring to the identifier of the cell, and a cell receiving node equipment receives the cell by selecting one of the two paths including the current system path and the stand-by path so as to transmit only the one cell which is received on the selected one of the two paths to an ATM terminal via an ATM interface;

wherein each node equipment has two cell switches, one cell switch having input-output corresponding to the primary ring, and the other cell switch having input-output corresponding to the secondary ring, the ATM interface mounted in each node equipment and connected to the ATM terminal so as to have input-output for each of the two cell switches, and the cell transmitting node equipment transmitting the cell to both the current system path and the stand-by system path by duplicating the cell in the ATM interface so as to transmit the cell having the same data to the two cell switches; and wherein a specific node equipment on the dual ring is regarded as the farthest upstream node equipment in the primary ring and as the farthest downstream node equipment in the secondary ring, the farthest downstream node equipment in the primary ring being positioned in the farthest upstream of the secondary ring, the primary ring and the secondary ring having as databases information associated with the order of the node equipments from the farthest upstream to the farthest downstream, the cell transmitting node equipment transmitting a cell having the same data to the two paths at a time of multicast, the node equipment positioned in the farthest downstream of both the rings, instead of setting the virtual connection assigned for the multicast in a downstream direction of the ring, receiving the cell to refer to the identifier of the cell so as to transmit the cell to an ATM terminal via an ATM interface without relaying the cell, the receiving node equipment on the paths being set in a state in which the cell can be received from two paths, and receiving the cell to refer to the identifier of the cell so as to relay and transmit the cell to an ATM terminal via an ATM interface.

* * * * *